(12) United States Patent
Tezuka et al.

(10) Patent No.: US 12,464,264 B2
(45) Date of Patent: Nov. 4, 2025

(54) IMAGING ELEMENT AND IMAGING DEVICE

(71) Applicant: NIKON CORPORATION, Tokyo (JP)

(72) Inventors: Yojiro Tezuka, Yokohama (JP); Tomoki Hirata, Tokyo (JP); Shiro Tsunai, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 77 days.

(21) Appl. No.: 17/800,410

(22) PCT Filed: Feb. 17, 2021

(86) PCT No.: PCT/JP2021/006008
§ 371 (c)(1),
(2) Date: Aug. 17, 2022

(87) PCT Pub. No.: WO2021/166978
PCT Pub. Date: Aug. 26, 2021

(65) Prior Publication Data
US 2023/0156367 A1    May 18, 2023

(30) Foreign Application Priority Data

Feb. 17, 2020 (JP) .................................. 2020-024778
Dec. 28, 2020 (JP) .................................. 2020-219510

(51) Int. Cl.
*H04N 25/57* (2023.01)
*H04N 25/766* (2023.01)
(Continued)

(52) U.S. Cl.
CPC ........... *H04N 25/766* (2023.01); *H04N 25/57* (2023.01); *H04N 25/77* (2023.01); *H04N 25/78* (2023.01)

(58) Field of Classification Search
CPC ...... H04N 25/535; H04N 25/57; H04N 25/58; H04N 25/583; H04N 25/75; H04N 25/766; H04N 25/77; H04N 25/78; H04N 25/79
See application file for complete search history.

(56) References Cited

U.S. PATENT DOCUMENTS 9,136,302 B2 * 9/2015 Wang ................. H01L 27/14683
12,108,180 B2 * 10/2024 Miyauchi ............. H04N 25/771
(Continued)

FOREIGN PATENT DOCUMENTS

CN    107925730 A    4/2018
EP    4 016 991 A1   6/2022
(Continued)

OTHER PUBLICATIONS

Apr. 13, 2021 International Search Report issued in International Patent Application No. PCT/JP2021/006008.
(Continued)

*Primary Examiner* — Lin Ye
*Assistant Examiner* — Chriss S Yoder, III
(74) *Attorney, Agent, or Firm* — Oliff PLC

(57) ABSTRACT

Provided is an image capturing device including a first substrate having a plurality of pixel blocks each including one or more pixels; and a second substrate having a control circuit unit including a first control block including a first exposure control unit for controlling an exposure time of a pixel included in a first pixel block of the plurality of pixel blocks and a second control block including a second exposure control unit for controlling an exposure time of a pixel included in a second pixel block of the plurality of pixel blocks, and a peripheral circuit unit arranged outside the control circuit unit and configured to control signal reading of pixels each included in at least the first pixel
(Continued)

block and the second pixel block of the plurality of pixel blocks.

30 Claims, 27 Drawing Sheets

(51) Int. Cl.
*H04N 25/77* (2023.01)
*H04N 25/78* (2023.01)

(56) References Cited

U.S. PATENT DOCUMENTS

| | | | | |
|---|---|---|---|---|
| 2010/0276572 | A1* | 11/2010 | Iwabuchi | H01L 27/14612 257/443 |
| 2018/0227514 | A1* | 8/2018 | Takahashi | H04N 25/79 |
| 2019/0020839 | A1* | 1/2019 | Velichko | H04N 23/54 |
| 2019/0075261 | A1 | 3/2019 | Machida et al. | |
| 2019/0103427 | A1* | 4/2019 | Matsumoto | H04N 25/745 |

FOREIGN PATENT DOCUMENTS

| | | |
|---|---|---|
| JP | 2013-051674 A | 3/2013 |
| JP | 2015-154413 A | 8/2015 |
| JP | 2015-532797 A | 11/2015 |
| JP | 2016-171375 A | 9/2016 |
| JP | 2019-068405 A | 4/2019 |
| KR | 10-2018-0033162 A | 4/2018 |
| WO | 2017/018188 A1 | 2/2017 |

OTHER PUBLICATIONS

Aug. 23, 2022 International Preliminary Report on Patentability issued in International Patent Application No. PCT/JP2021/006008.
Sep. 12, 2023 Office Action issued in Japanese Patent Application No. 2022-501949.
Feb. 7, 2024 Search Report issued in European Patent Application No. 21756893.0.
Feb. 21, 2024 Office Action issued in Korean Patent Application No. 10-2022-7028293.
Oct. 30, 2024 Office Action issued in European Patent Application No. 21 756 893.0.
Dec. 17, 2024 Office Action issued in Japanese Patent Application No. 2024-079671.
Jan. 25, 2025 Office Action issued in Chinese Patent Application No. 202180015005.X.
Jun. 10, 2025 Office Action issued in Japanese Patent Application No. 2024-079671.

* cited by examiner

IMAGING ELEMENT AND IMAGING DEVICE

TECHNICAL FIELD

The present invention relates to an image capturing device and an image capturing apparatus.

RELATED ART

It is known to change an exposure time for each pixel in an image capturing apparatus having a plurality of pixels (for example, Patent Document 1).

Patent Document 1: Japanese Patent Application Publication No. 2015-532797

In the image capturing apparatus of the related art, it is needed to simplify a circuit.

GENERAL DISCLOSURE

A first aspect of the present invention provides an image capturing device including a first substrate having a plurality of pixel blocks each including one or more pixels; and a second substrate having a control circuit unit including a first control block including a first exposure control unit for controlling an exposure time of a pixel included in a first pixel block of the plurality of pixel blocks and a second control block including a second exposure control unit for controlling an exposure time of a pixel included in a second pixel block of the plurality of pixel blocks, and a peripheral circuit unit arranged outside the control circuit unit and configured to control signal reading of pixels each included in at least the first pixel block and the second pixel block of the plurality of pixel blocks.

A second aspect of the present invention provides an image capturing apparatus including the image capturing device of the first aspect.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

In the present specification, the X-axis and the Y-axis are orthogonal to each other, and the Z-axis is orthogonal to the XY plane. The XYZ axes constitute a right-handed system. A direction parallel to the Z-axis may be referred to as a stacking direction of the image capturing device 400. As used herein, the terms "upper" and "lower" are not limited to the upper and lower direction in the direction of gravity. These terms just refer to relative directions in the Z-axis direction. Note that, in the present specification, the alignment in the X-axis direction is described as a "row" and the alignment in the Y-axis direction is described as a "column", but the row and column directions of are not limited thereto.

Figure 1A:
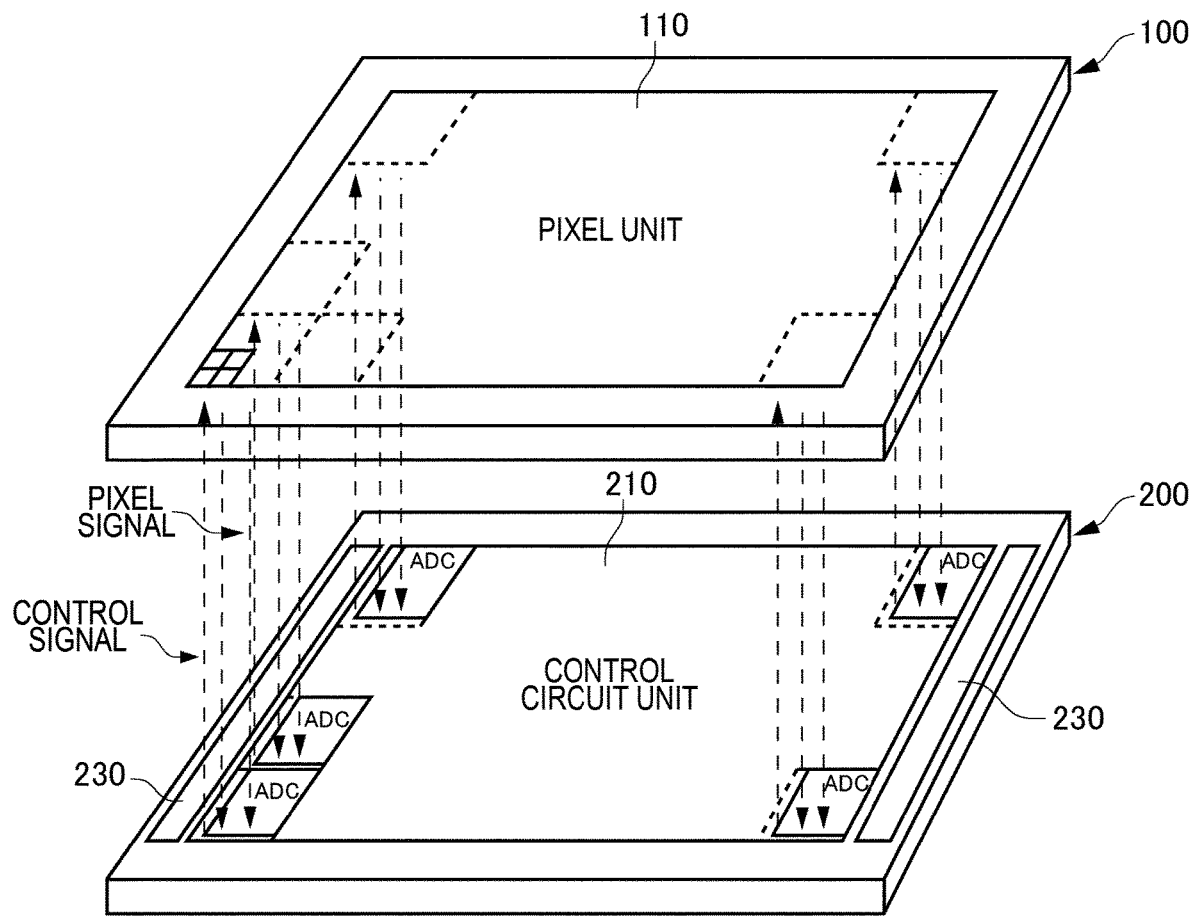
FIG. 1A shows an outline of an image capturing device 400 according to an embodiment of the present invention.

FIG. 1A shows an outline of an image capturing device 400 according to the present embodiment. The image capturing device 400 is configured to capture a photographic subject. The image capturing device 400 is configured to generate image data of the captured photographic subject. The image capturing device 400 includes a first substrate 100 and a second substrate 200. As shown in FIG. 1A, the first substrate 100 is stacked on the second substrate 200.

The first substrate 100 has a pixel unit 110. The pixel unit 110 is configured to output a pixel signal based on incident light.

The second substrate 200 has a control circuit unit 210 and a peripheral circuit unit 230.

A pixel signal output from the first substrate 100 is input to the control circuit unit 210. The control circuit unit 210 is configured to process the input pixel signal. The control circuit unit 210 of the present example is arranged at a position on the second substrate 200, which faces the pixel unit 110. The control circuit unit 210 may be configured to output a control signal for controlling drive of the pixel unit 110 to the pixel unit 110.

The peripheral circuit unit 230 is configured to control drive of the control circuit unit 210. In an example, the peripheral circuit unit 230 is configured to control signal reading of a pixel included in the pixel unit 110. The peripheral circuit unit 230 is arranged at the periphery of the control circuit unit 210 on the second substrate 200. In addition, the peripheral circuit unit 230 may be electrically connected to the first substrate 100 to control drive of the pixel unit 110. The peripheral circuit unit 230 of the present example is arranged along two sides of the second substrate 200. However, the arrangement method of the peripheral circuit unit 230 is not limited to the present example.

Note that, the image capturing device 400 may have a memory chip stacked on the second substrate 200, in addition to the first substrate 100 and the second substrate 200. For example, the memory chip is configured to perform image processing corresponding to a signal output by the second substrate 200. Further, a structure of the image capturing device 400 may be of a back side illumination type or a front side illumination type.

Figure 1B:
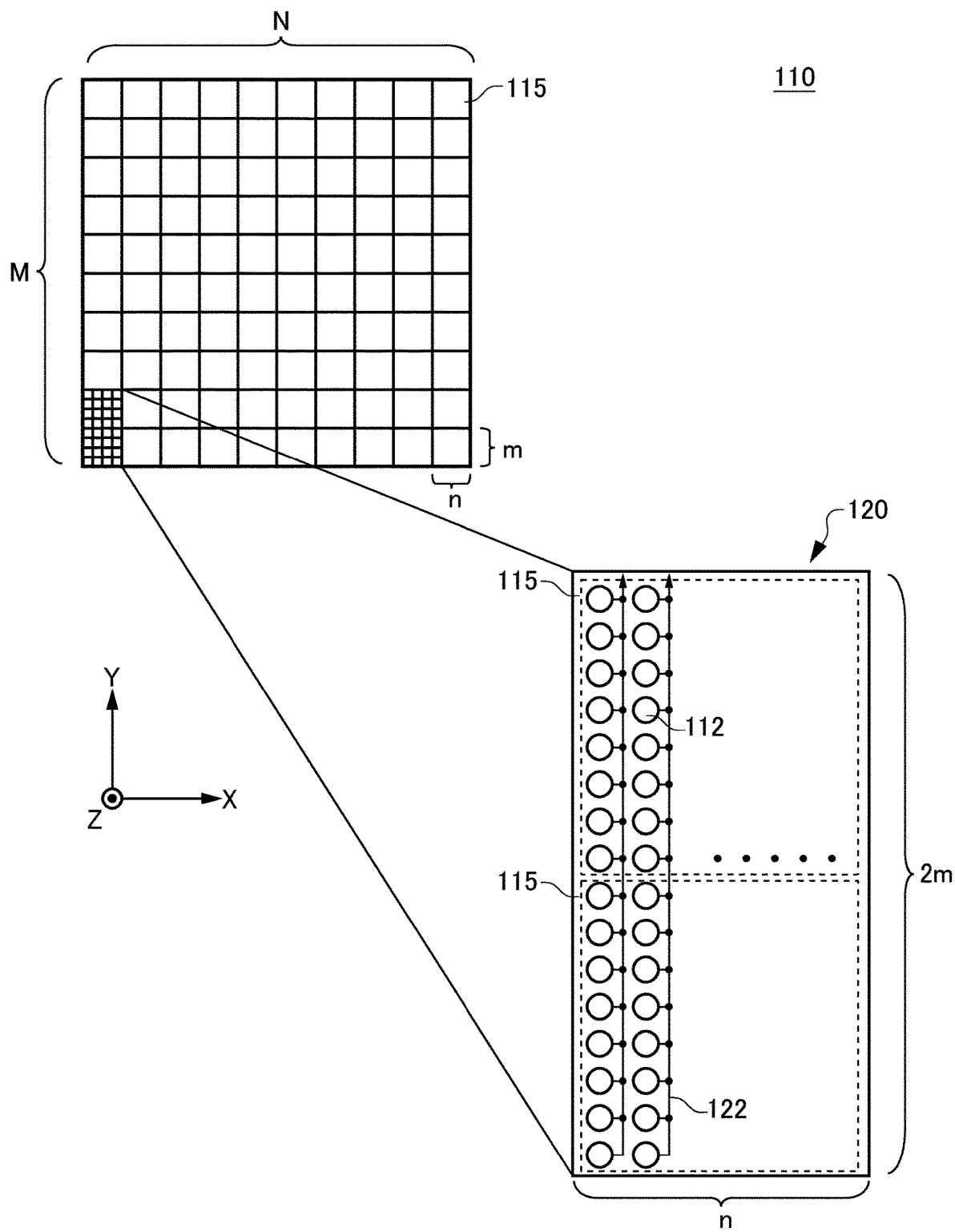
FIG. 1B shows an example of a specific configuration of a pixel unit 110.

FIG. 1B shows an example of a specific configuration of the pixel unit 110. In the present example, the pixel unit 110 and an enlarged view of a pixel block 120 provided to the pixel unit 110 are shown.

The pixel unit 110 has a plurality of pixel groups 115 arranged side by side along the row and column directions. The pixel unit 110 of the present example has M×N pixel groups 115 (M and N are natural numbers). The present example shows a case where M is equal to N, but M and N may be different.

The pixel group 115 has at least one pixel 112. The pixel group 115 of the present example has m×n pixels 112 (m and n are natural numbers). For example, the pixel group 115 has 16×16 pixels 112. The number of the pixels 112 corresponding to the pixel group 115 is not limited thereto. The present example shows a case where m is equal to n, but m and n may be different. The pixel group 115 has a plurality of pixels 112 connected to a common control line in the row direction. For example, each pixel 112 of the pixel group 115 is connected to the common control line so as to be set to the same exposure time. In an example, n pixels 112 aligned in the row direction are connected by the common control line.

On the other hand, the pixel groups 115 may be set to different exposure times, respectively. That is, each pixel 112 of the pixel group 115 has the same exposure time, but other pixel groups 115 may be set to different exposure times. For example, when the pixels 112 of the pixel group 115 are connected by the common control line in the row direction, the pixels 112 of the other pixel groups 115 are commonly connected by different control lines.

A pixel block 120 has one or more pixel groups 115. The pixel block 120 of the present example has two pixel groups 115 arranged side by side along the column direction. The pixel block 120 is arranged corresponding to a control block 220, which will be described later. That is, two pixel groups 115 are arranged for one control block 220. When the pixel block 120 has a plurality of pixel groups 115, the respective pixel groups 115 may be set to different exposure times. When the pixel block 120 has one pixel group 115, one pixel group 115 is arranged for the control block 220. The pixel block 120 has 2m×n pixels 112. For example, the pixel block 120 has 32×16 pixels 112. The number of the pixels 112 corresponding to the pixel block 120 is not limited thereto.

The pixel 112 has a photoelectric converting function of converting light into electric charges. The pixel 112 is configured to accumulate the photoelectrically converted electric charges. The 2m pixels 112 are arranged along the column direction and connected to a common signal line 122. The 2m pixels 112 are aligned side by side in n columns in the row direction in the pixel block 120.

Figure 1C:
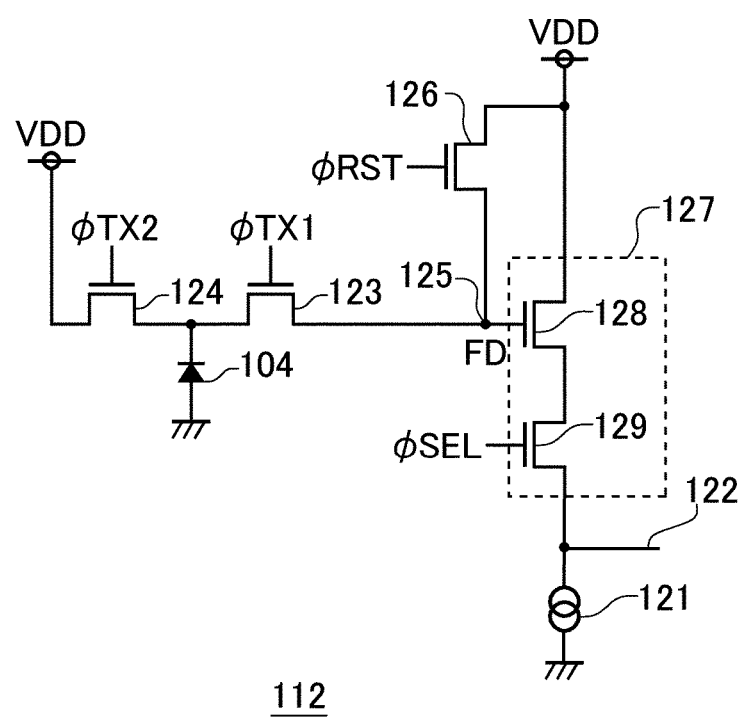
FIG. 1C shows an example of a circuit configuration of a pixel 112.

FIG. 1C shows an example of a circuit configuration of the pixel 112. The pixel 112 has a photoelectric converting unit 104, a transfer unit 123, an outlet 124, a reset unit 126 and a pixel output unit 127. The pixel output unit 127 has an amplifying unit 128 and a selecting unit 129. In the present example, the transfer unit 123, the outlet 124, the reset unit 126, the amplifying unit 128 and the selecting unit 129 are described as N-channel FETs, but the type of transistor is not limited thereto.

The photoelectric converting unit 104 has a photoelectric converting function of converting light into electric charges. The photoelectric converting unit 104 is configured to accumulate the photoelectrically converted electric charges. The photoelectric converting unit 104 is, for example, a photo diode.

The transfer unit 123 is configured to transfer the electric charges accumulated in the photoelectric converting unit 104 to an accumulating unit 125. The transfer unit 123 is an example of a transfer gate configured to transfer electric charges of the photoelectric converting unit 104. A gate terminal of the transfer unit 123 is connected to a local control line for inputting a first transfer control signal $\Phi TX1$. The local control line will be described later.

The outlet 124 is configured to discharge the electric charges accumulated in the photoelectric converting unit 104 to a power supply wiring to which a power supply voltage VDD is supplied. A gate terminal of the outlet 124 is connected to a local control line for inputting a second transfer control signal $\Phi TX2$. Note that, in the present example, the outlet 124 is described as discharging the electric charges of the photoelectric converting unit 104 to the power supply wiring to which the power supply voltage VDD is supplied, but may be configured to discharge the electric charges to a power supply wiring to which a power supply voltage different from the power supply voltage VDD is supplied.

The electric charges from the photoelectric converting unit 104 are transferred to the accumulating unit 125 by the transfer unit 123. The accumulating unit 125 is an example of a floating diffusion (FD).

The reset unit 126 is configured to discharge the electric charges of the accumulating unit 125 to the power supply wiring to which a predetermined power supply voltage VDD is supplied. A gate terminal of the reset unit 126 is connected to a global control line 163 for inputting a reset control signal $\Phi RST$. The global control line 163 will be described later.

The pixel output unit 127 is configured to output a signal based on a potential of the accumulating unit 125 to a signal line 122. The pixel output unit 127 has an amplifying unit 128 and a selecting unit 129. The amplifying unit 128 has a gate terminal connected to the accumulating unit 125, a drain terminal connected to the power supply wiring to which the power supply voltage VDD is supplied, and a source terminal connected to a drain terminal of the selecting unit 129.

The selecting unit 129 is configured to control electrical connection between the pixel 112 and the signal line 122. When the pixel 112 and the signal line 122 are electrically connected by the selecting unit 129, a pixel signal is output from the pixel 112 to the signal line 122. A gate terminal of the selecting unit 129 is connected to the global control line 163 for inputting a selection control signal ΦSEL. A source terminal of the selecting unit 129 is connected to a load current source 121.

The load current source 121 is configured to supply current to the signal line 122. The load current source 121 may be provided to the first substrate 100 or the second substrate 200.

Figure 1D:
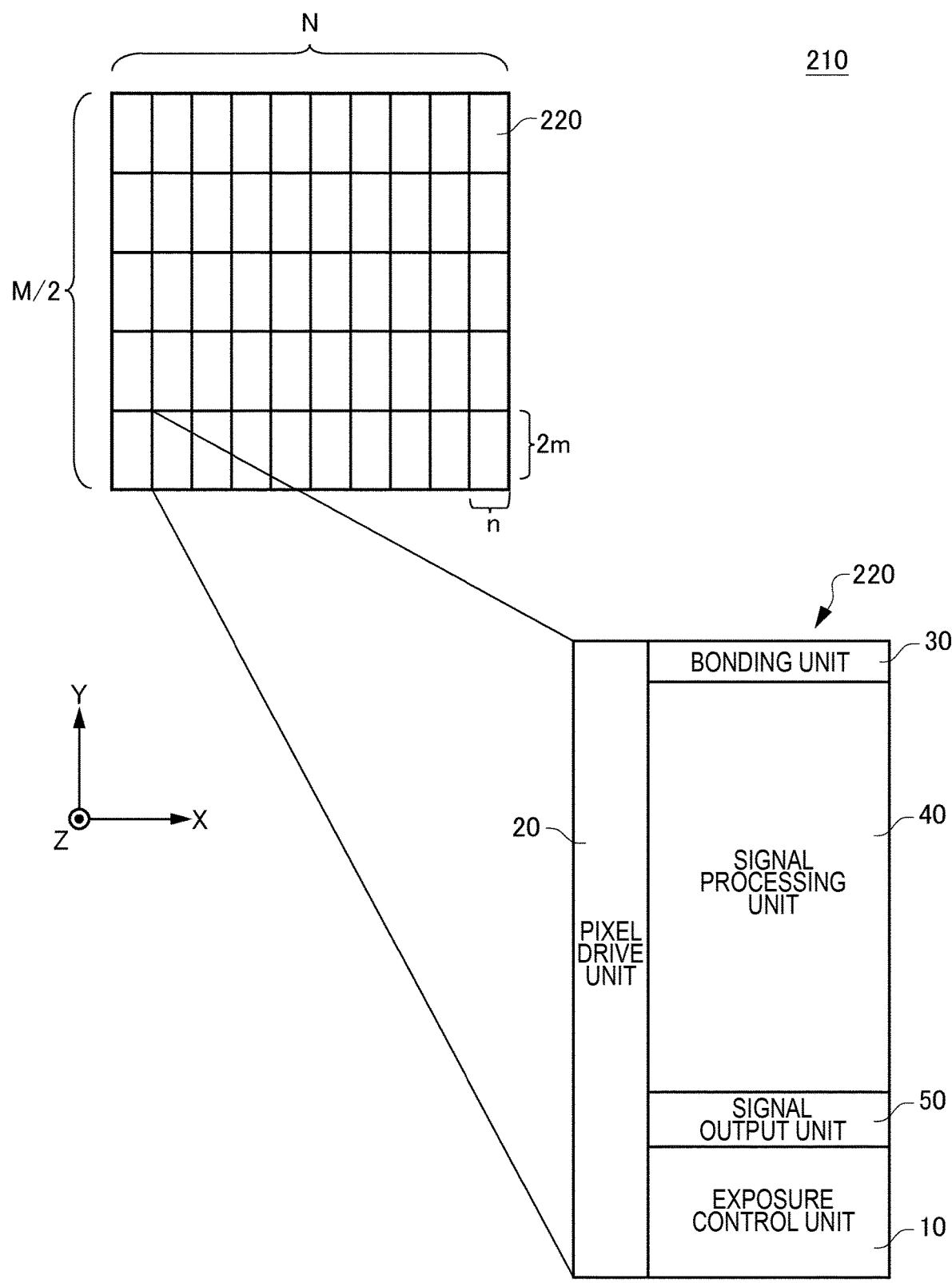
FIG. 1D shows an example of a more specific configuration of a control circuit unit 210.

FIG. 1D shows an example of a more specific configuration of the control circuit unit 210. In the present example, the control circuit unit 210 and an enlarged view of the control block 220 provided to the control circuit unit 210 are shown.

The control circuit unit 210 has control blocks 220 arranged along the row and column directions. The control circuit unit 210 of the present example has (M/2)×N control blocks 220. In the present example, the control circuit unit 210 has one control block 220 for two pixel groups 115 arranged side by side along the column direction.

The control blocks 220 are arranged at positions corresponding to the pixel blocks 120, respectively. The control block 220 is configured to control drive of the corresponding pixel block 120. For example, the control block 220 is configured to control an exposure time of the pixel block 120. The control block 220 may be configured to control the exposure time for each pixel group 115. In addition, the control block 220 has a processing circuit such as an AD converter, and is configured to process a signal output by the pixel block 120. In an example, the control block 220 is configured to convert an analog pixel signal output from the corresponding pixel block 120 into a digital signal. The control block 220 of the present example includes an exposure control unit 10, a pixel drive unit 20, a joining unit 30, a signal processing unit 40 and a signal output unit 50.

The exposure control unit 10 is configured to control exposures of the plurality of pixels 112. The exposure control unit 10 is configured to generate a signal for controlling an exposure time of the pixel 112. In an example, the exposure control unit 10 is configured to control the exposure time for each pixel group 115 by adjusting at least one of a start timing or an end timing of exposure. The exposure control unit 10 of the present example is provided extending in the row direction.

The pixel drive unit 20 is joined to the first substrate 100 and is configured to drive the plurality of pixels 112. The pixel drive unit 20 is configured to select and drive an arbitrary pixel 112 from the plurality of pixels 112. The pixel drive unit 20 of the present example is provided extending in the column direction. Thereby, the pixel drive unit 20 is arranged at a position corresponding to the 2m pixels 112 arranged in the column direction. As the pixel drive unit 20 extends in the column direction and the exposure control unit 10 extends in the row direction, the exposure control unit 10 and the pixel drive unit 20 are arranged in an L shape.

The joining unit 30 is configured to join the first substrate 100 and the second substrate 200 each other. The joining unit 30 is configured to input a pixel signal input from the first substrate 100 to the signal processing unit 40. The joining unit 30 is provided corresponding to the n pixels 112 arranged in the row direction, and is configured to input a pixel signal to the signal processing unit 40 for each column.

The signal processing unit 40 is configured to digitally convert an analog signal output by the pixel unit 110. The signal processing unit 40 of the present example is configured to convert an analog pixel signal into a digital signal. The signal processing unit 40 is configured to digitally convert sequentially analog signals from the 2m pixels 112 aligned in the column direction. The signal processing unit 40 is configured to digitally convert analog signals from the pixels 112 aligned in n columns in the row direction in parallel.

The signal output unit 50 is configured to receive the digital signal from the signal processing unit 40. In an example, the signal output unit 50 is configured to temporarily store the digital signal. The signal output unit 50 may have a latch circuit for storing a digital signal. The signal output unit 50 is provided between the signal processing unit 40 and the exposure control unit 10 in the column direction, and is configured to output a digital signal. The signal output unit 50 of the present example is configured to output a digital signal to an outside of the control circuit unit 210. The signal output unit 50 extends in the row direction and is provided adjacent to the signal processing unit 40 and the exposure control unit 10.

The image capturing device 400 of the present example has a function of reading pixel signals in parallel by the control block 220 provided for each pixel block 120. Since the image capturing device 400 can set an exposure time for each pixel group 115 according to the intensity of incident light, a dynamic range can be expanded.

Figure 1E:
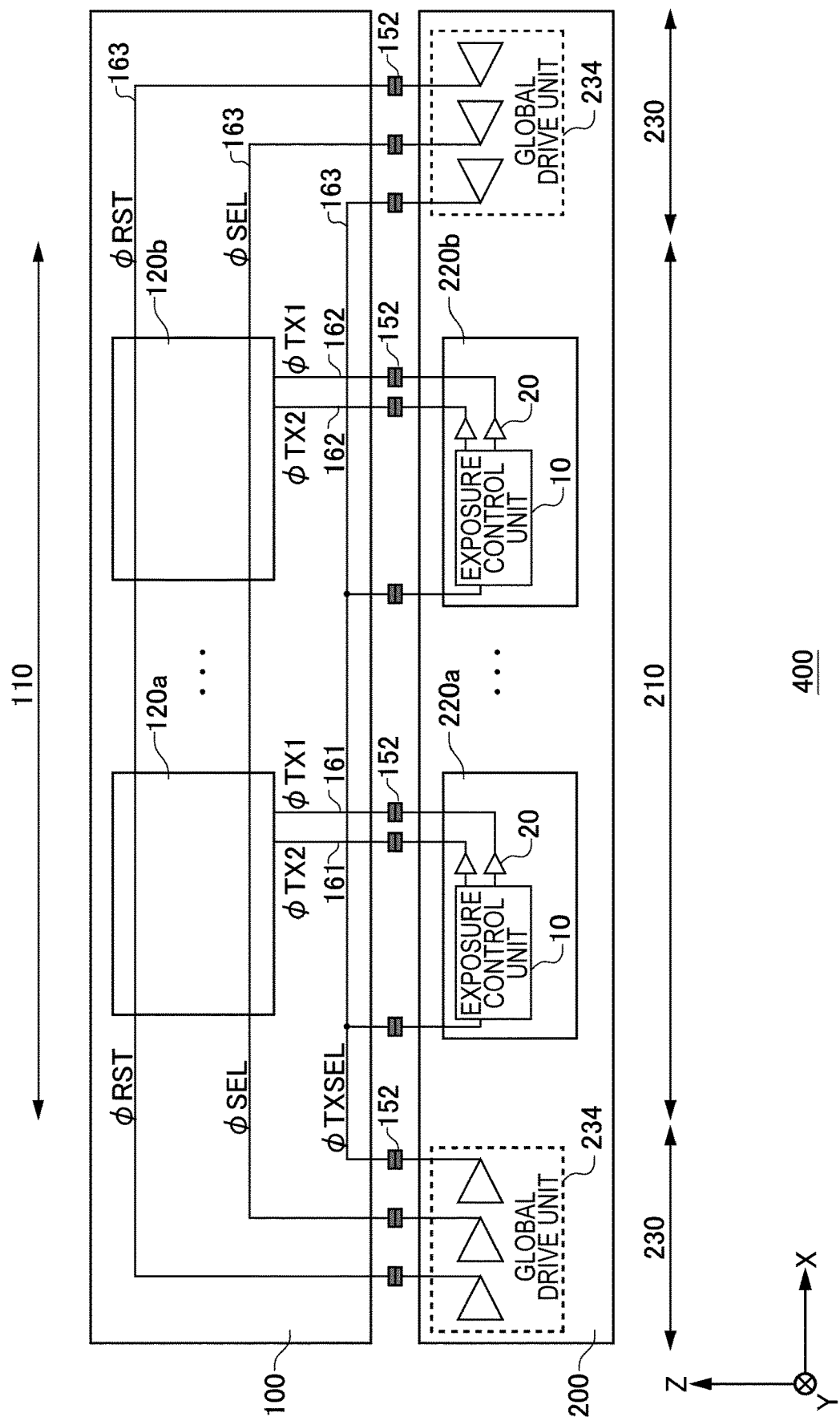
FIG. 1E illustrates an example of a wiring method of the image capturing device 400.

FIG. 1E illustrates an example of a wiring method of the image capturing device 400. A global drive unit 234 of the present example is provided at each of the peripheral circuit units 230 arranged with both ends of the control circuit unit 210 interposed therebetween.

A local control line 161 is connected to a pixel block 120a. The local control line 161 of the present example is connected to the gate terminals of the transfer unit 123 and the outlet 124 provided to the pixel block 120a. The local control line 161 is configured to supply, to the pixel block 120a, the first transfer control signal ΦTX1 and the second transfer control signal ΦTX2 output from a control block 220a. The local control line 161 is an example of the first control line connected to the first pixel of the pixel block 120. Note that, the local control line 161 may be provided corresponding to the pixel group 115 of the pixel block 120a. For example, in the pixel group 115, the common local control line 161 is connected to the n pixels 112 aligned in the row direction.

A local control line 162 is connected to a pixel block 120b. The local control line 162 of the present example is connected to the gate terminals of the transfer unit 123 and the outlet 124 provided to the pixel block 120b. The local control line 162 is configured to supply, to the pixel block 120b, the first transfer control signal ΦTX1 and the second transfer control signal ΦTX2 output from a control block 220b. The local control line 162 is an example of the second control line connected to the second pixel of the pixel block 120. Note that, the local control line 162 may be provided corresponding to the pixel group 115 of the pixel block 120b. For example, in the pixel group 115, the common local control line 162 is connected to the n pixels 112 aligned in the row direction.

The global drive unit 234 is configured to output a reset control signal ΦRST, a selection control signal ΦSEL and a transfer selection control signal ΦTXSEL. The global drive unit 234 is connected to the global control line 163 configured to output a signal to each pixel block 120. The global drive unit 234 is configured to supply the reset control signal ΦRST and the selection control signal ΦSEL to the plurality of pixel blocks 120 via the global control line 163. The global drive unit 234 is configured to supply the transfer selection control signal ΦTXSEL to the plurality of control blocks 220 via the global control line 163.

The transfer selection control signal ΦTXSEL is supplied from the global drive unit 234 to the control block 220 so as to control the exposure time of each pixel group 115. The control block 220 supplied with the transfer selection control signal ΦTXSEL is configured to output the transfer selection control signal ΦTXSEL to the corresponding pixel block 120. The pixel block 120 is configured to determine whether to input the transfer selection control signal ΦTXSEL to the pixel 112 as the first transfer control signal ΦTX1 or the second transfer control signal ΦTX2. Thereby, the input of the first transfer control signal ΦTX1 or the second transfer control signal ΦTX2 to the pixel 112 is skipped.

For example, the control block 220 is configured to extend the exposure time by skipping the first transfer control signal ΦTX1 when the first transfer control signal ΦTX1 determines an end time of exposure. In addition, the control block 220 can shorten the exposure time by skipping the first transfer control signal ΦTX1 when the first transfer control signal ΦTX1 determines a start time of exposure. In this way, the exposure time of the pixel group 115 can be adjusted by the transfer selection control signal ΦTXSEL. The same is true when the second transfer control signal ΦTX2 determines the start time or end time of exposure.

The global control line 163 is provided in common to the plurality of pixel blocks 120. The global control line 163 of the present example is wired across the first substrate 100 in the row direction. The global control line 163 may be wired across the first substrate 100 in the column direction. The global control line 163 is an example of the third control line provided in common to a pixel connected to the local control line 161 and a pixel connected to the local control line 162.

For example, the global control line 163 is connected to the gate terminals of the reset unit 126 and the selecting unit 129 of the pixel block 120 and is configured to supply the reset control signal ΦRST and the selection control signal ΦSEL. In addition, the global control line 163 is connected to each of the plurality of control blocks 220 and is configured to supply the transfer selection control signal ΦTXSEL to the exposure control unit 10.

Note that, the global drive unit 234 of the present example is configured to output the transfer selection control signal ΦTXSEL from the second substrate 200 to the first substrate 100, but may also be configured to output the transfer selection control signal ΦTXSEL to the control block 220 without supplying the same to the first substrate 100. In this case, the global control line 163 is provided to the second substrate 200.

A plurality of bumps 152 is provided on a joining surface at which the first substrate 100 and the second substrate 200 are joined to each other. The bumps 152 of the first substrate 100 are positionally aligned with the bumps 152 of the second substrate 200. The plurality of bumps 152 facing each other are joined and thus electrically connected by a pressurization treatment or the like on the first substrate 100 and the second substrate 200.

The image capturing device 400 of the present example is configured to control the exposure time for each pixel group 115 by changing a timing of at least one of the transfer unit 123 and the outlet 124 by the local control line. The image capturing device 400 can implement control of the exposure time with fewer control lines by combining the local control line and the global control line.

Figure 2A:
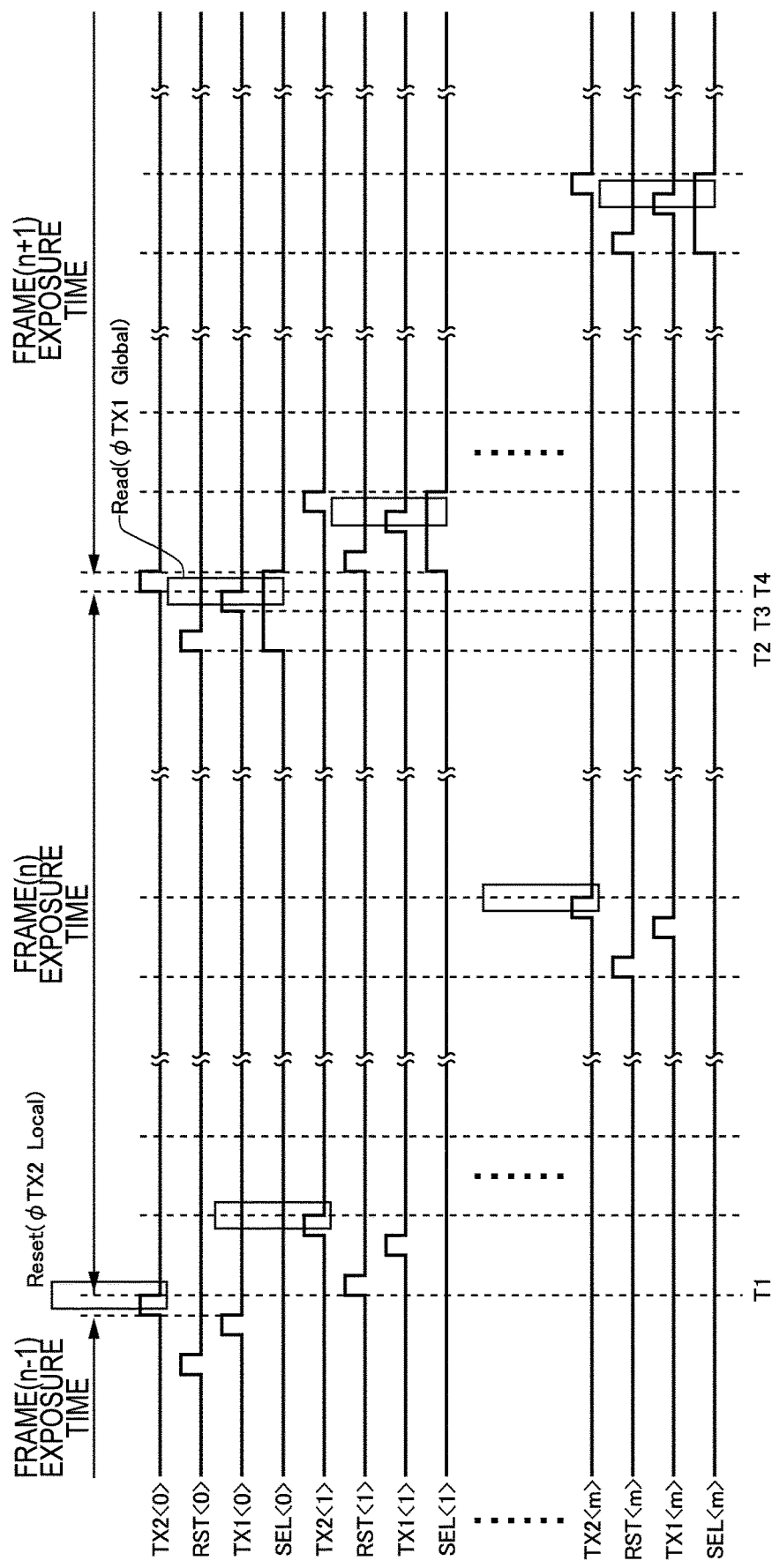
FIG. 2A shows an example of a timing chart showing an image capturing operation of the image capturing device 400.

FIG. 2A shows an example of a timing chart showing an image capturing operation of the image capturing device 400. In the present example, drive of the image capturing device 400 is controlled by the first transfer control signal ΦTX1, the second transfer control signal ΦTX2, the reset control signal ΦRST, and the selection control signal ΦSEL.

The second transfer control signal ΦTX2 controls a timing to start exposure. The start timing of exposure corresponds to a fall timing (for example, time T1) of the second transfer control signal ΦTX2. That is, before start time T1 of exposure, the second transfer control signal ΦTX2 turns on the outlet 124 to discharge the electric charges accumulated in the photoelectric converting unit 104, and exposure starts resulting from the fall of the second transfer control signal ΦTX2. Since the second transfer control signal ΦTX2 of the present example is locally controlled, the exposure time can be adjusted for each pixel group 115.

The first transfer control signal ΦTX1 controls a timing to end exposure. At time T3, the first transfer control signal ΦTX1 turns on the transfer unit 123 to transfer the electric charges accumulated in the photoelectric converting unit 104 to the accumulating unit 125. The end timing of exposure corresponds to a fall timing (for example, time T4) of the first transfer control signal ΦTX1. Since the first transfer control signal ΦTX1 of the present example is a globally controlled signal, the timing to end exposure in each pixel group 115 is the same.

The reset control signal ΦRST controls a discharge timing of the electric charges accumulated in the accumulating unit 125. At time T2, the reset control signal ΦRST turns on the reset unit 126 to discharge the electric charges of the accumulating unit 125. In the present example, by discharging the electric charges of the accumulating unit 125 before the end timing of exposure, it is possible to suppress an influence of the electric charges remaining in the accumulating unit 125 at the time of transferring the electric charges from the photoelectric converting unit 104.

The selection control signal ΦSEL is a signal for selecting an arbitrary pixel 112. The selection control signal ΦSEL controls on/off of the selecting unit 129. At time T2, the selection control signal ΦSEL is set high. At time T3, the pixel 112 for which the selection control signal ΦSEL is set high outputs a pixel signal to the signal line 122, in response to turn-on of the first transfer control signal ΦTX1. On the other hand, the pixel 112 for which the selection control signal ΦSEL is not set high does not output a pixel signal.

The image capturing device 400 of the present example can control the exposure time for each pixel group 115 by locally controlling the second transfer control signal ΦTX2 to change the start timing of exposure for each pixel group 115. Further, the image capturing device 400 may control the end timing of exposure for each pixel group 115 by locally controlling the first transfer control signal ΦTX1. The image capturing device 400 may control both the start timing and end timing of exposure for each pixel group 115 by locally controlling both the first transfer control signal ΦTX1 and the second transfer control signal ΦTX2.

Figure 2B:
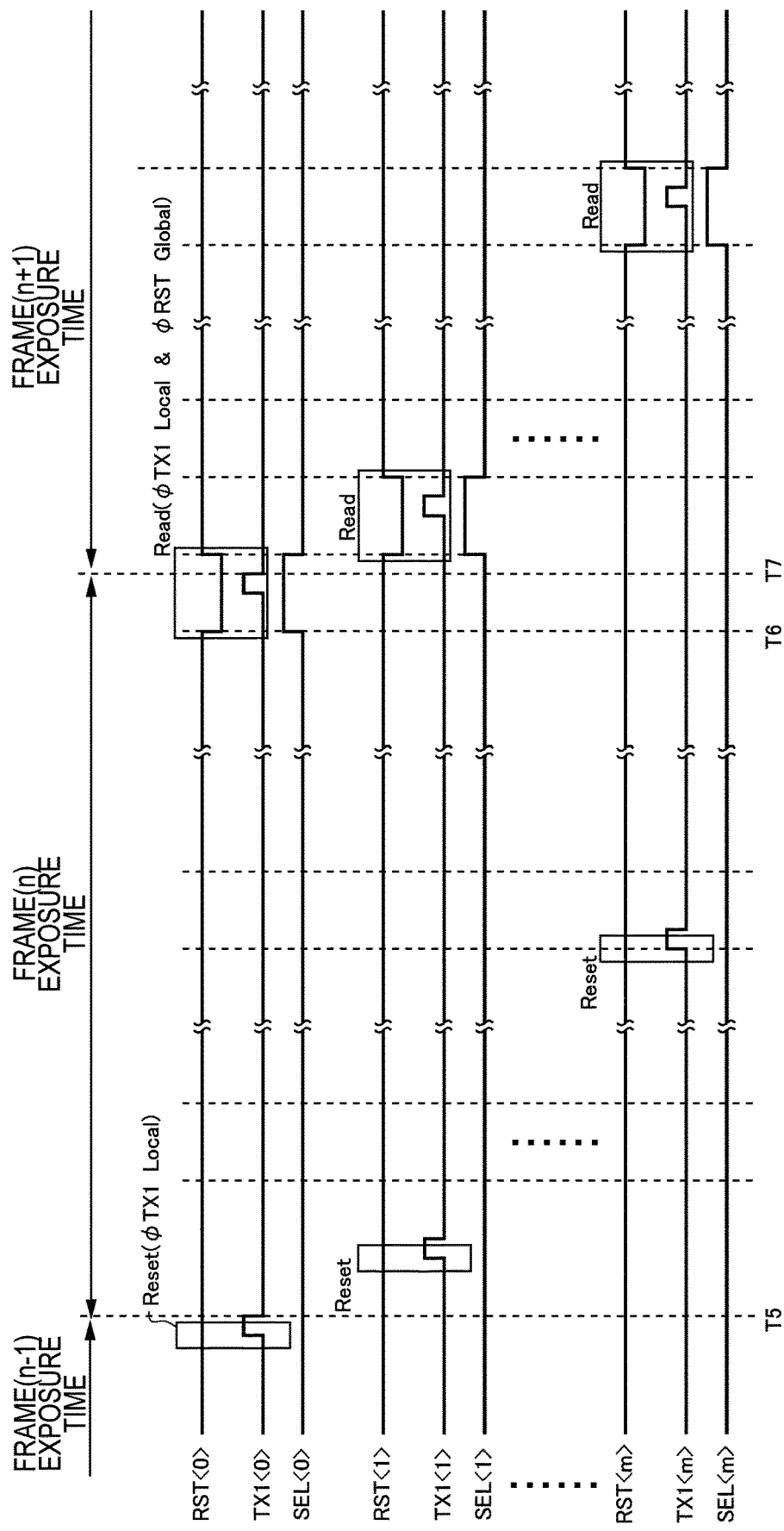
FIG. 2B shows an example of the timing chart showing the image capturing operation of the image capturing device 400.

FIG. 2B shows an example of a timing chart showing the image capturing operation of the image capturing device 400. In the present example, drive of the image capturing device 400 is controlled by the first transfer control signal ΦTX1, the reset control signal ΦRST, and the selection control signal ΦSEL. The present example is different from the case of FIG. 2A, in that the image capturing device 400 controls the start timing of exposure by the first transfer control signal ΦTX1. In the present example, differences from FIG. 2A will be particularly described.

The first transfer control signal ΦTX1 controls the start timing and end timing of exposure. In frame (n), exposure starts at time T5 and ends at time T7.

At start time T5 of exposure, the exposure starts as the first transfer control signal ΦTX1 falls. That is, before start time T5 of exposure, the first transfer control signal ΦTX1 turns on the transfer unit 123 to discharge the electric charges accumulated in the photoelectric converting unit 104 in a state in which the reset control signal ΦRST is on, and exposure starts resulting from the fall of the first transfer control signal ΦTX1. Since the first transfer control signal ΦTX1 of the present example is a locally controlled signal, it is possible to change the timing to start exposure in each pixel group 115. However, the timing to start exposure in each pixel group 115 may be matched.

In addition, at end time T7 of exposure, the exposure ends as the first transfer control signal ΦTX1 falls. That is, before end time T7 of exposure, the first transfer control signal ΦTX1 turns on the transfer unit 123 to transfer the electric charges accumulated in the photoelectric converting unit 104 to the accumulating unit 125 in a state in which the reset control signal ΦRST is off, and exposure ends resulting from the fall of the first transfer control signal ΦTX1. Since the first transfer control signal ΦTX1 of the present example is a locally controlled signal, it is possible to change the timing to end exposure in each pixel group 115. However, the timing to end exposure in each pixel group 115 may be matched.

The selection control signal ΦSEL is a signal for selecting an arbitrary pixel 112. At time T6, the pixel 112 for which the selection control signal ΦSEL is set high outputs a pixel signal to the signal line 122.

The reset control signal ΦRST controls a discharge timing of the electric charges accumulated in the accumulating unit 125. The reset control signal ΦRST may be a globally controlled signal. Since the reset control signal ΦRST is always on except the timing of reading, electric charges are not accumulated in the accumulating unit 125. On the other hand, by turning off the reset control signal ΦRST and turning on the first transfer control signal ΦTX1 at the timing of reading, the electric charges are transferred from the photoelectric converting unit 104 to the accumulating unit 125. The reset control signal ΦRST of the present example has the same switching timing at the time of reading, and therefore, can be shared with a pulse of the selection control signal ΦSEL.

The image capturing device 400 of the present example can control the exposure time for each pixel group 115 by locally controlling the first transfer control signal ΦTX1 to change the start or end timing of exposure for each pixel group 115. In addition, since the image capturing device 400 shares the pulses of the reset control signal ΦRST and the selection control signal ΦSEL, the control circuit can be further simplified.

Figure 3:
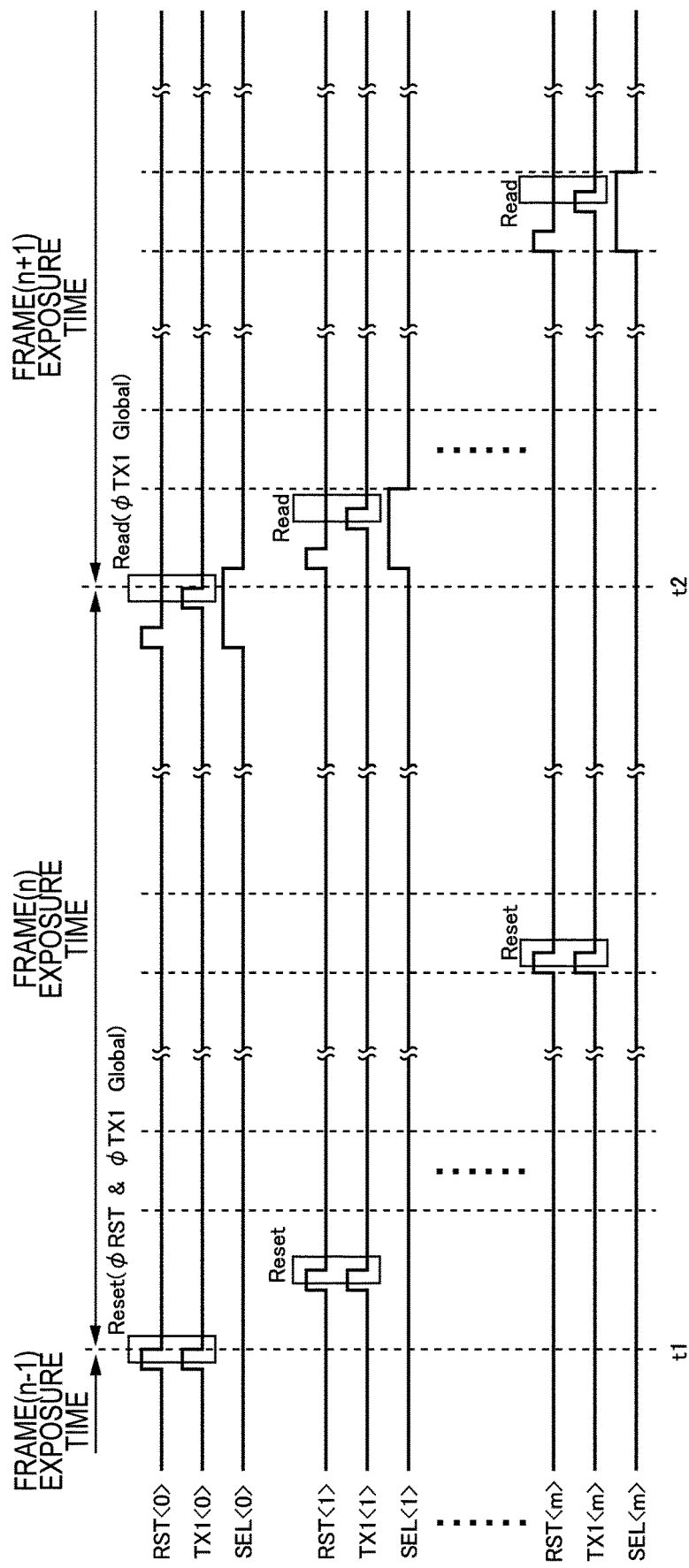
FIG. 3 shows a timing chart showing an image capturing operation of an image capturing device according to a comparative example.

FIG. 3 shows a timing chart showing an image capturing operation of an image capturing device according to a comparative example. In the present example, drive of the image capturing device is controlled by the first transfer control signal ΦTX1, the reset control signal ΦRST, and the selection control signal ΦSEL.

In the comparative example, the start of exposure is controlled by the first transfer control signal ΦTX1 and the reset control signal ΦRST. The start timing of exposure is a fall timing (time t1) of the first transfer control signal ΦTX1 and the reset control signal ΦRST. The end timing of exposure is a fall timing (time t2) of the first transfer control signal ΦTX1. In the comparative example, the start timing and end timing of exposure are globally controlled, and the exposure time is not controlled for each pixel group 115.

Figure 4A:
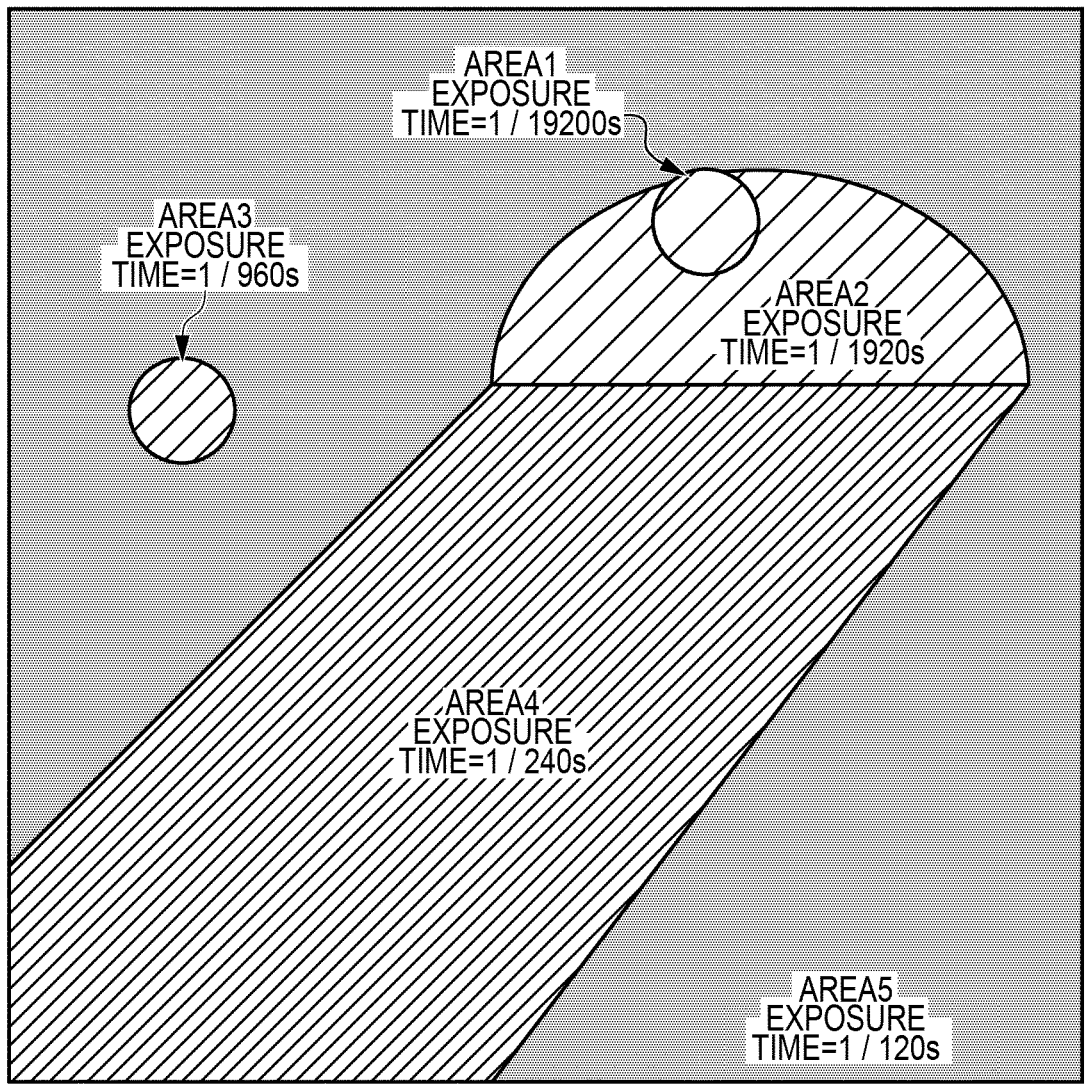
FIG. 4A shows an example of a photographic subject that is captured by the image capturing device 400.

FIG. 4A shows an example of a photographic subject that is captured by the image capturing device 400. The image capturing device 400 of the present example controls the exposure time for each pixel group 115 in a situation where the sun is shining outside the tunnel.

Area 1 to area 5 are five areas divided according to brightness. Area 1 to area 5 are numbered in ascending order of brightness. Area 1 is the brightest area where the setting sun is directly visible. Area 2 is an area corresponding to the exit of the tunnel, and is darker than area 1. Area 3 is an area inside the tunnel where the setting sun is reflected, and is darker than area 2. Area 4 is an area inside the tunnel where the setting sun from the exit enters, and is darker than area 3. Area 5 is the darkest area inside the tunnel where the setting sun from the exit does not enter.

The image capturing device 400 controls the exposure time for each pixel group 115, according to the brightness of each area. The image capturing device 400 controls such that the exposure time becomes shorter for the pixel group 115 in a brighter area. The exposure time for area 1 is set to be the shortest, and the exposure time for area 5 is set to be the longest. For example, the exposure times for area 1 to area 5 are $1/19200$ s, $1/1920$ s, $1/960$ s, $1/240$ s and $1/120$ s.

Figure 4B:
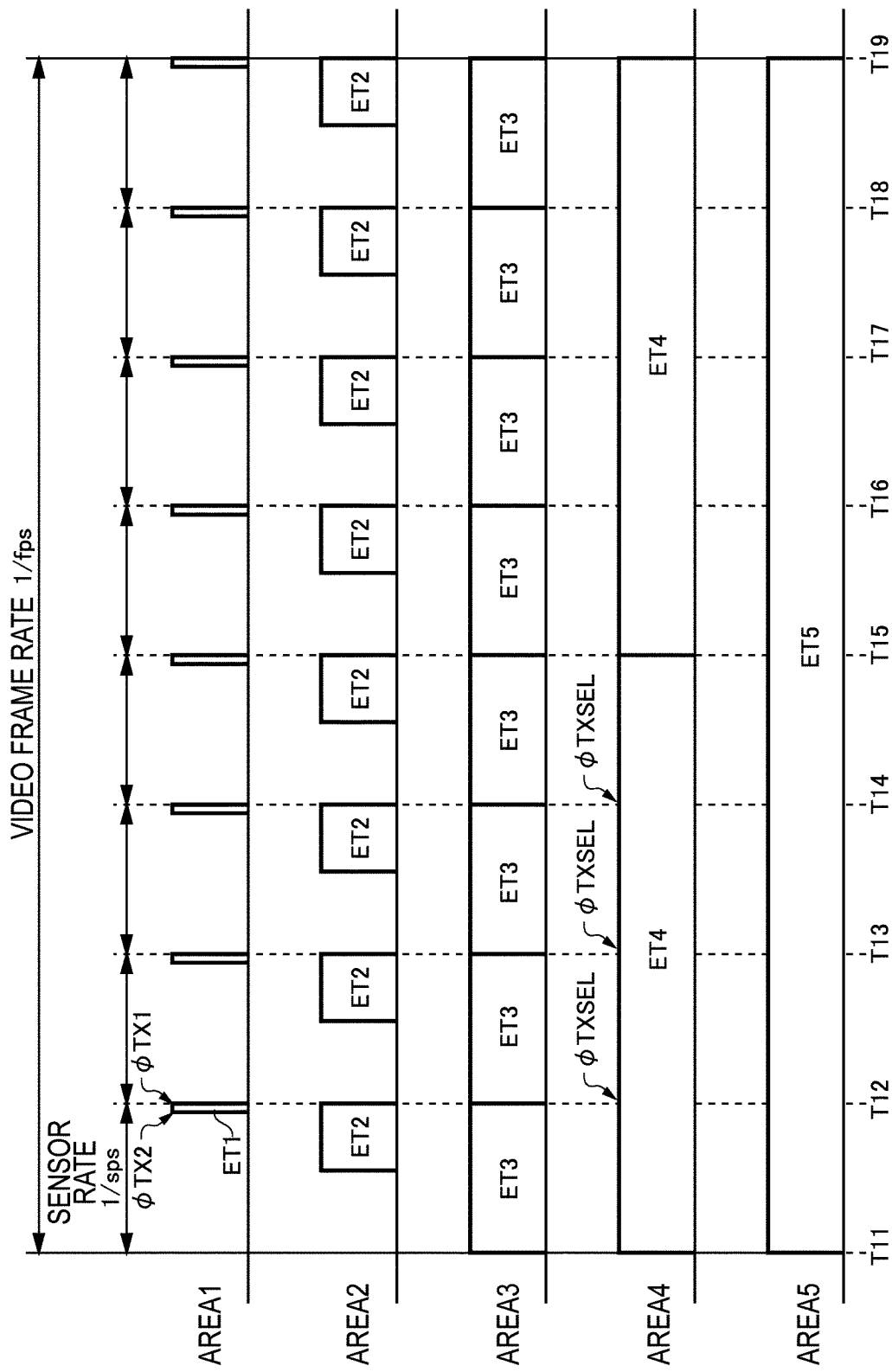
FIG. 4B shows a timing chart showing the image capturing operation of the image capturing device 400.

FIG. 4B shows a timing chart showing the image capturing operation of the image capturing device 400. The image capturing device 400 of the present example controls the exposure time for each pixel group 115 of area 1 to area 5. In the present example, a section from time T11 to time T19 corresponds to a video frame rate.

In area 1, the control block 220 controls drive such that the exposure time in the pixel group 115 becomes a predetermined exposure time ET1. The control block 220 of the present example controls the start of exposure with the second transfer control signal ΦTX2 and controls the end of exposure with the first transfer control signal ΦTX1. In area 1, exposure ends at each of time T12 to time T19.

In area 2, the control block 220 controls drive such that the exposure time in the pixel group 115 becomes an exposure time ET2 longer than ET1. The control block 220 makes the exposure start time of area 2 earlier than that of area 1, thereby making the end time of exposure coincide with that of area 1. Therefore, in area 2, exposure ends at each of time T12 to time T19. The exposure time ET2 of area 2 is shorter than a period of a sensor rate.

In area 3, the control block 220 controls drive such that the exposure time in the pixel group 115 becomes an exposure time ET3 longer than ET2. The control block 220 makes the exposure start time of area 3 earlier than that of area 2, thereby making the end time of exposure coincide with that of area 2. Therefore, in area 3, exposure ends at each of time T12 to time T19. The exposure time ET3 of area 3 is set to be the same as the period of the sensor rate.

In area 4, the control block 220 controls drive such that the exposure time in the pixel group 115 becomes an exposure time ET4 longer than ET3. The control block 220 makes the exposure start time of area 4 be the same as that of area 3, but skips the end time of exposure by the transfer selection control signal ΦTXSEL. The control block 220 of the present example implements an exposure time four times that of area 3 by skipping the end time of exposure three times by the transfer selection control signal ΦTXSEL. In area 4, the transfer selection control signal ΦTXSEL is supplied at each time of time T12 to time T14.

In area 5, the control block 220 controls drive such that the exposure time in the pixel group 115 becomes an exposure time ET5 longer than ET4. The control block 220 makes the exposure start time of area 5 be the same as that of area 4, but increases the number of times of skipping the end time of exposure by the transfer selection control signal ΦTXSEL. The control block 220 of the present example implements an exposure time two times that of area 4 by skipping seven times by the transfer selection control signal ΦTXSEL. The exposure time ET5 of area 5 is set to be the same as the period of the video frame rate. In area 5, the transfer selection control signal ΦTXSEL is supplied at each time of time T12 to time T18.

The image capturing device 400 of the present example implements short-second exposure by shortening an interval between the first transfer control signal ΦTX1 and the second transfer control signal ΦTX2. In addition, the image capturing device 400 implements long-second exposure by skipping the control of the first transfer control signal ΦTX1 by the transfer selection control signal ΦTXSEL. This makes it possible to expand a dynamic range.

Figure 5:
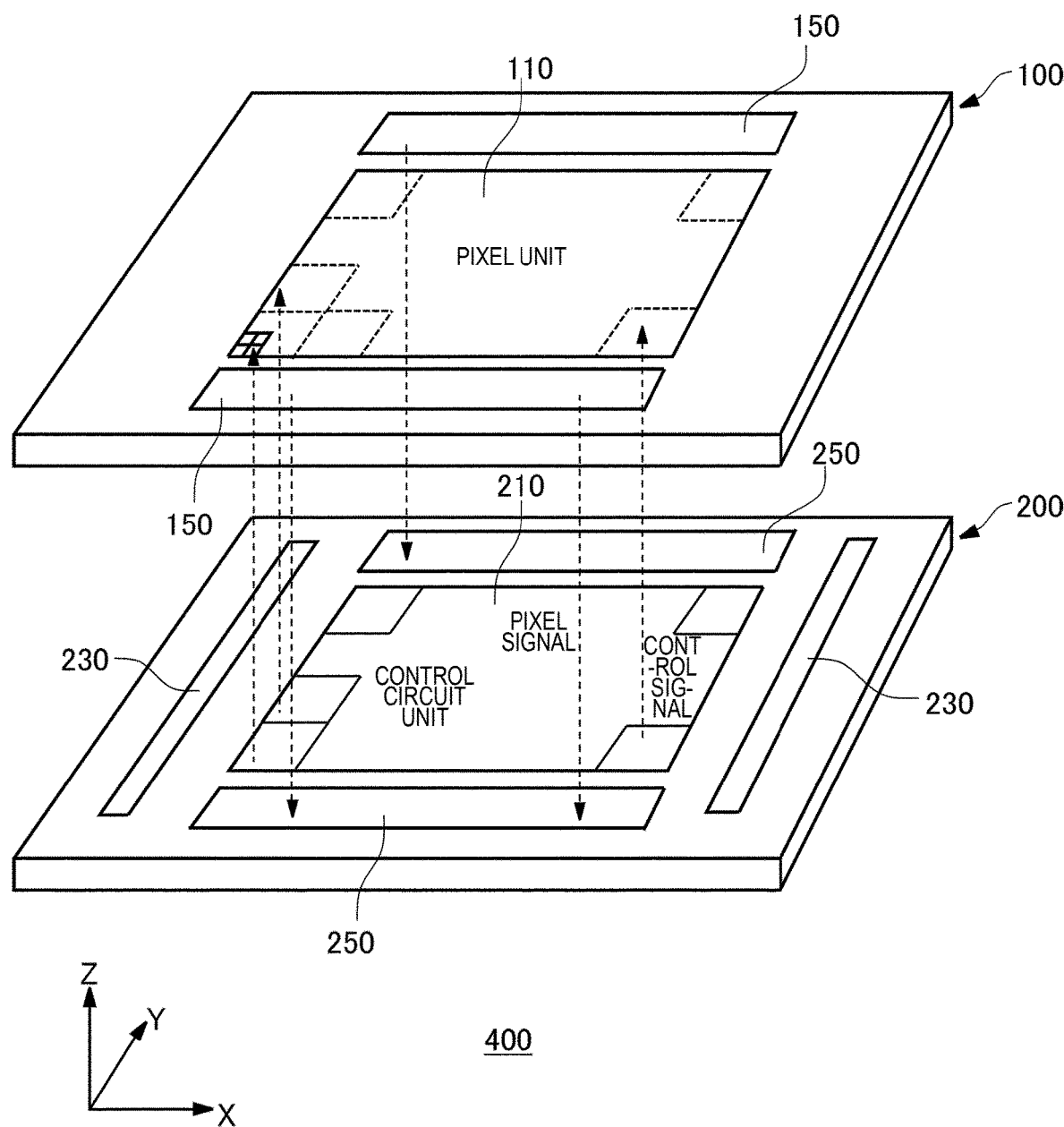
FIG. 5 shows an outline of the image capturing device 400.

FIG. 5 shows an outline of the image capturing device 400. The image capturing device 400 is configured to capture a photographic subject. The image capturing device 400 is configured to generate image data of the captured photographic subject. The image capturing device 400 includes a first substrate 100 and a second substrate 200. As shown in FIG. 5, the first substrate 100 is stacked on the second substrate 200.

The first substrate 100 has a pixel unit 110 and a connection region 150. Light is incident on the pixel unit 110. The pixel unit 110 is configured to output a pixel signal based on the incident light. The first substrate 100 may be referred to as a pixel chip. The connection region 150 is arranged at the periphery of the pixel unit 110. In the example of FIG. 5, a pair of connection regions 150 is arranged in front of and behind the pixel unit 110 along two sides of the first substrate 100 facing each other.

The second substrate 200 has a control circuit unit 210, a peripheral circuit unit 230 and a signal processing unit 250. The second substrate 200 may be referred to as a processing circuit chip.

The control circuit unit 210 is configured to output a control signal for controlling drive of the pixel unit 110 to the pixel unit 110. The control circuit unit 210 of the present example is arranged at a position on the second substrate 200, which faces the pixel unit 110.

The peripheral circuit unit 230 is configured to control drive of the control circuit unit 210. The peripheral circuit unit 230 is arranged at the periphery of the control circuit unit 210 on the second substrate 200. In addition, the peripheral circuit unit 230 may be electrically connected to the first substrate 100 to control drive of the pixel unit 110. The peripheral circuit unit 230 of the present example is arranged along two sides of the second substrate 200 facing each other. However, the arrangement method of the peripheral circuit unit 230 is not limited to the present example.

A pixel signal output from the first substrate 100 is input to the signal processing unit 250. The signal processing unit 250 is configured to perform signal processing on the pixel signal. For example, the signal processing unit 250 is configured to perform processing of converting an analog signal into a digital signal. Specifically, the signal processing unit 250 is configured to perform processing of converting an input pixel signal into a digital signal. The signal processing unit 250 may also be configured to perform other signal processing. Examples of the other signal processing include noise removing processing such as analog or digital CDS (Correlated Double Sampling). The signal processing unit 250 is arranged at the periphery of, i.e., outside the control circuit unit 210. In the example of FIG. 5, a pair of signal processing units 250 is arranged in front of and behind the control circuit unit 210 along two sides of the second substrate 200 facing each other.

Note that, the image capturing device 400 may have a third substrate stacked on the second substrate 200, in addition to the first substrate 100 and the second substrate 200. A memory for storing image data may be arranged on the third substrate. In addition, the third substrate may be configured to perform image processing corresponding to a signal output by the second substrate 200. Further, a structure of the image capturing device 400 may be of a back side illumination type or a front side illumination type.

Figure 6:
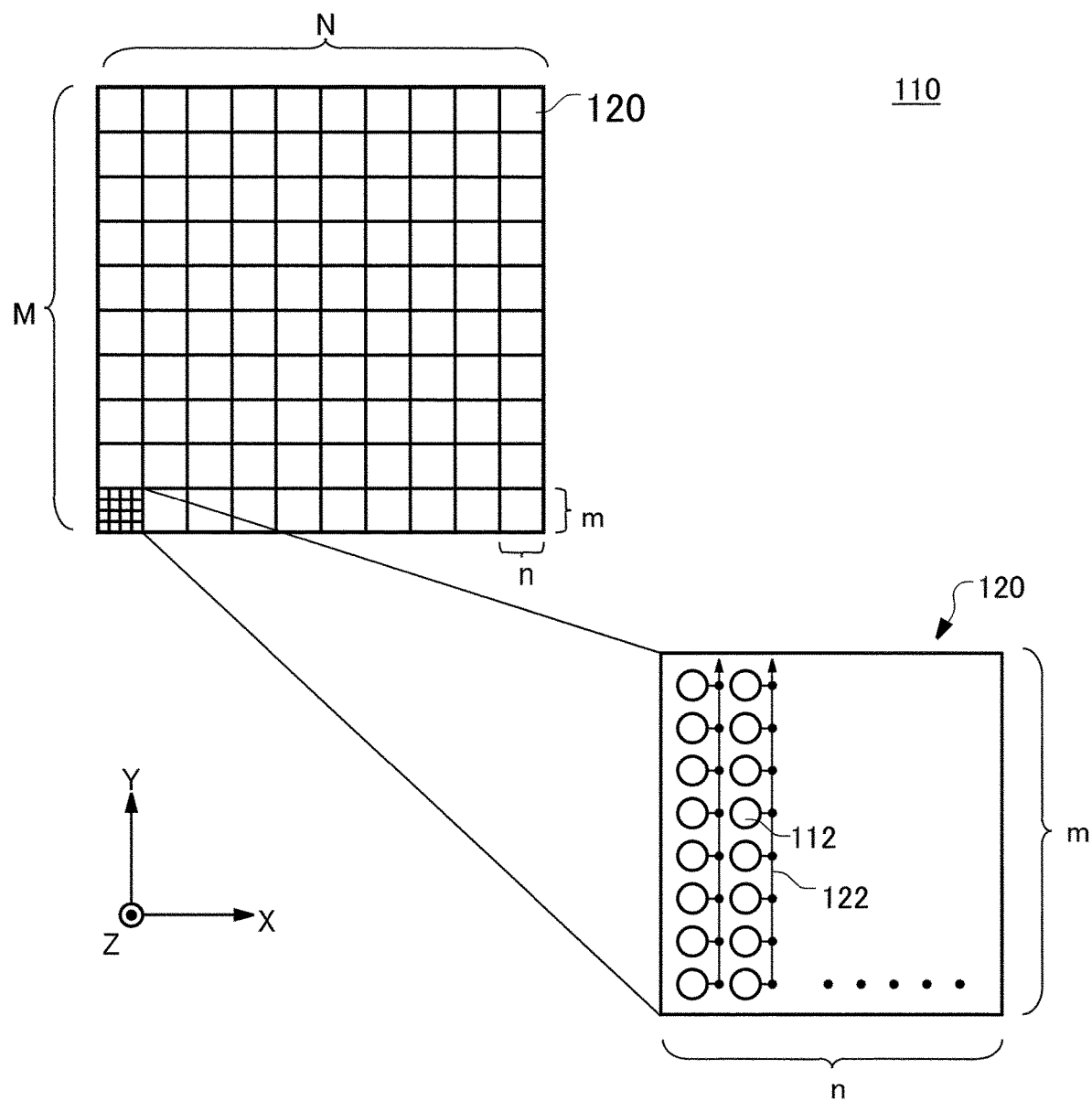
FIG. 6 shows an example of a specific configuration of the pixel unit 110.

FIG. 6 shows an example of a specific configuration of the pixel unit 110. In the present example, the pixel unit 110 and an enlarged view of a pixel block 120 provided to the pixel unit 110 are shown.

The pixel unit 110 has a plurality of pixel blocks 120 arranged side by side along the row and column directions. The pixel unit 110 of the present example has M×N pixel blocks 120 (M and N are natural numbers). The present example shows a case where M is equal to N, but M and N may be different.

The pixel block 120 has at least one pixel 112. The pixel block 120 of the present example has m×n pixels 112 (m and n are natural numbers). For example, the pixel block 120 has 16×16 pixels 112. The number of the pixels 112 corresponding to the pixel block 120 is not limited thereto. The present example shows a case where m is equal to n, but m and n may be different. The pixel block 120 has a plurality of pixels 112 connected to a common control line in the row direction. For example, each pixel 112 of the pixel block 120 is connected to the common control line so as to be set to the same exposure time. In an example, n pixels 112 aligned in the row direction are connected by the common control line.

On the other hand, the pixel plurality of pixel blocks 120 may be set to different exposure times, respectively. That is, each pixel 112 of the pixel block 120 has the same exposure time, but other pixel blocks 120 may be set to different exposure times. For example, when the pixels 112 of the pixel block 120 are connected by the common control line in the row direction, the pixels 112 of the other pixel blocks 120 are commonly connected by different control lines.

The pixel block 120 is arranged corresponding to a control block 220, which will be described later. In the present embodiment, one pixel block 120 is arranged for one control block 220.

The pixel 112 has a photoelectric converting function of converting light into electric charges. The pixel 112 is configured to accumulate the photoelectrically converted electric charges. The m pixels 112 are arranged side by side along the column direction and are connected to a common signal line 122. The m pixels 112 are aligned side by side in n columns in the row direction in the pixel block 120.

In other words, the pixel block 120 is a set of a plurality of pixels 112 connected by a common control line. In addition, the pixel block 120 can be referred to as a minimum unit of a circuit of a plurality of pixels 112 for which the same exposure time is set.

Figure 7:
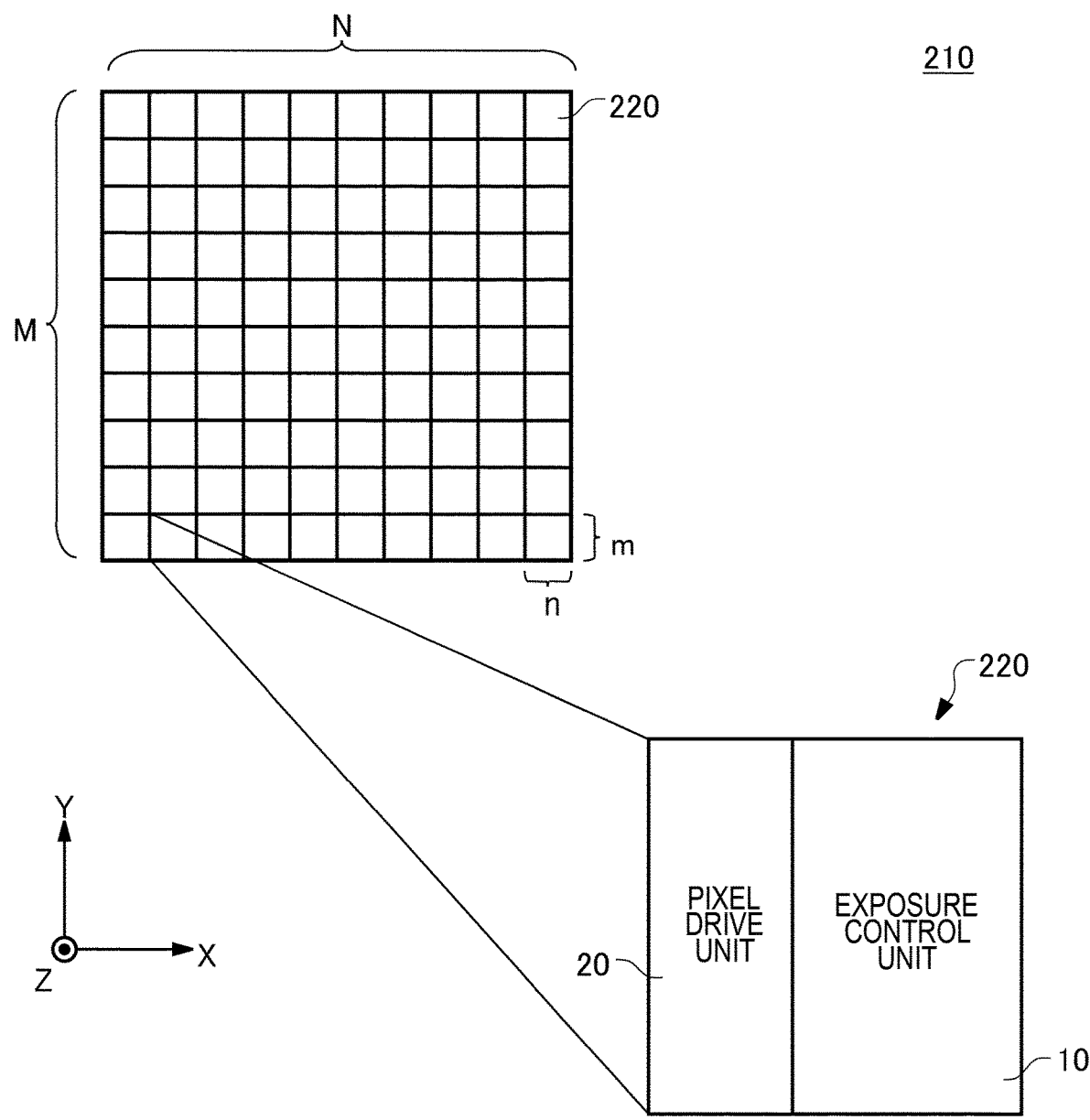
FIG. 7 shows an example of a more specific configuration of the control circuit unit 210.

FIG. 7 shows an example of a more specific configuration of the control circuit unit 210. In the present example, the control circuit unit 210 and an enlarged view of the control block 220 provided to the control circuit unit 210 are shown.

The control circuit unit 210 has control blocks 220 arranged side by side along the row and column directions. The control circuit unit 210 of the present example has M×N control blocks 220.

The control blocks 220 are arranged at positions corresponding to the pixel blocks 120, respectively. For example, the control block 220 and the pixel block 120 are arranged at positions overlapping each other, when seen in the stacking direction of the first substrate 100 and the second substrate 200. In this case, areas of the control block 220 and the pixel block 120 may be substantially the same, including margins between adjacent blocks.

The control block 220 is configured to control drive of the corresponding pixel block 120. For example, the control block 220 is configured to control an exposure time of the corresponding pixel block 120. The control block 220 of the present example includes an exposure control unit 10 and a pixel drive unit 20.

The exposure control unit 10 is configured to control exposures of the plurality of pixels 112. The exposure control unit 10 is configured to generate a signal for controlling the exposure time of the pixel 112. In an example, the exposure control unit 10 is configured to control the exposure time for each pixel block 120 by adjusting at least one of a start timing or an end timing of exposure.

The pixel drive unit 20 is electrically connected to a plurality of pixels 112 and is configured to drive the plurality of pixels 112. The pixel drive unit 20 is configured to select and drive an arbitrary pixel 112 from the plurality of pixels 112. The pixel drive unit 20 is arranged at a position corresponding to the m pixels 112 arranged in the column direction. Since the image capturing device 400 can set an exposure time for each pixel block 120 according to the intensity of incident light, a dynamic range can be expanded.

Instead of providing one control block 220 for one pixel block 120, one control block may be provided for N pixel blocks 120 (N is a natural number equal to or greater than 2). The N pixel blocks 120 corresponding to one pixel block may be referred to as a pixel block group. For example, one control block 220 may be provided while using two pixel blocks 120 arranged side by side along the column direction as one pixel block group. In this case, the control block 220 may be configured to control the exposure time for each pixel block 120.

Additionally remarking, the control block 220 is electrically connected to at least one pixel block 120 and can be referred to as a minimum unit of a circuit configured to control exposures of the pixels 112 of the at least one pixel block 120.

Figure 8:
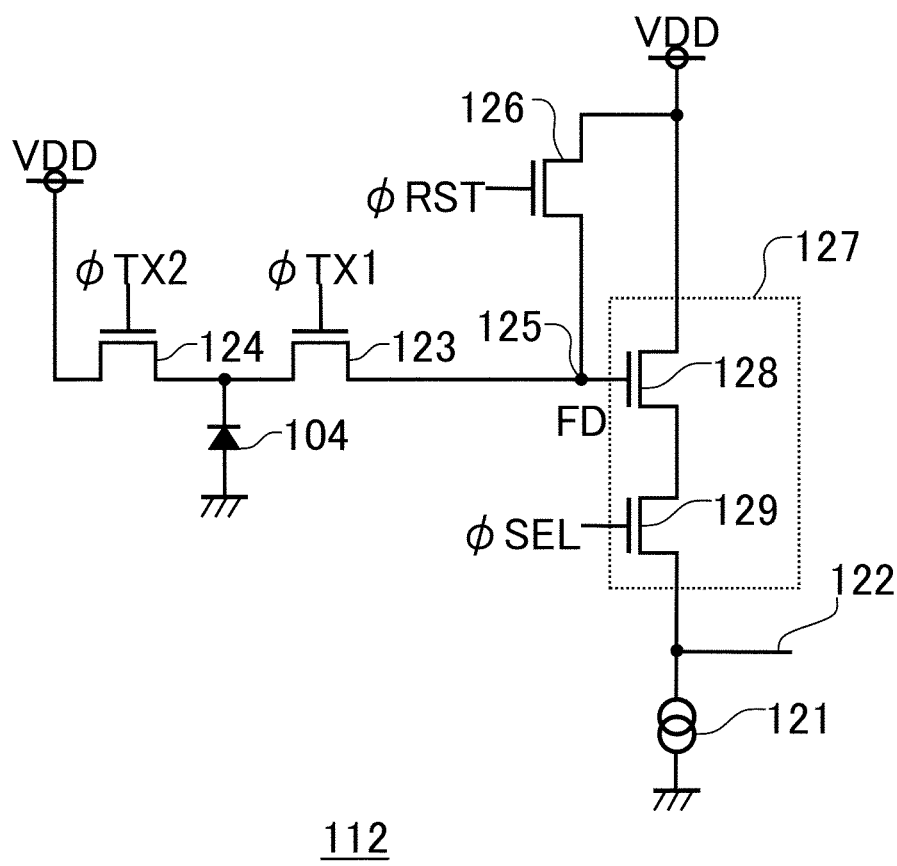
FIG. 8 shows an example of a circuit configuration of the pixel 112.

FIG. 8 shows an example of a circuit configuration of the pixel 112. The pixel 112 has a photoelectric converting unit 104, a transfer unit 123, an outlet 124, a reset unit 126 and a pixel output unit 127. The pixel output unit 127 has an amplifying unit 128 and a selecting unit 129. In the present example, the transfer unit 123, the outlet 124, the reset unit 126, the amplifying unit 128 and the selecting unit 129 are described as N-channel FETs, but the type of transistor is not limited thereto.

The photoelectric converting unit 104 has a photoelectric converting function of converting light into electric charges. The photoelectric converting unit 104 is configured to accumulate the photoelectrically converted electric charges. The photoelectric converting unit 104 is, for example, a photo diode.

The transfer unit 123 is configured to transfer the electric charges accumulated in the photoelectric converting unit 104 to an accumulating unit 125. The transfer unit 123 is an example of a transfer gate configured to transfer electric charges of the photoelectric converting unit 104. In other words, the transfer unit 123 as a gate, the photoelectric converting unit 104 as a source, and the accumulating unit 125 as a drain constitute a so-called transfer transistor. A gate terminal of the transfer unit 123 is connected to a local transfer control line for each pixel block 120 for inputting a control signal ΦTX1.

The outlet 124 is configured to discharge the electric charges accumulated in the photoelectric converting unit 104 to a power supply wiring to which a power supply voltage VDD is supplied. A gate terminal of the outlet 124 is connected to a local discharge control line for each pixel block 120 for inputting a discharge control signal ΦTX2. Note that, in the present example, the outlet 124 is described as discharging the electric charges of the photoelectric converting unit 104 to the power supply wiring to which the power supply voltage VDD is supplied, but may be configured to discharge the electric charges to a power supply wiring to which a power supply voltage different from the power supply voltage VDD is supplied.

The electric charges from the photoelectric converting unit 104 are transferred to the accumulating unit 125 by the transfer unit 123. The accumulating unit 125 is an example of a floating diffusion (FD).

The reset unit 126 is configured to discharge the electric charges of the accumulating unit 125 to the power supply wiring to which the predetermined power supply voltage VDD is supplied. A gate terminal of the reset unit 126 is connected to a global reset control line over a plurality of pixel blocks 120 for inputting a reset control signal ΦRST.

The pixel output unit 127 is configured to output a signal based on a potential of the accumulating unit 125 to a signal line 122. The pixel output unit 127 has an amplifying unit 128 and a selecting unit 129. The amplifying unit 128 has a gate terminal connected to the accumulating unit 125, a drain terminal connected to the power supply wiring to which the power supply voltage VDD is supplied, and a source terminal connected to a drain terminal of the selecting unit 129.

The selecting unit 129 is configured to control electrical connection between the pixel 112 and the signal line 122. When the pixel 112 and the signal line 122 are electrically connected by the selecting unit 129, a pixel signal is output from the pixel 112 to the signal line 122. A gate terminal of the selecting unit 129 is connected to a global selection control line over a plurality of pixel blocks 120 for inputting a selection control signal ΦSEL. A source terminal of the selecting unit 129 is connected to a load current source 121.

The load current source 121 is configured to supply current to the signal line 122. The load current source 121 may be provided to the first substrate 100 or the second substrate 200.

Hereinafter, any of signals based on the electric charges accumulated in the photoelectric converting unit 104, the electric charges transferred to the accumulating unit 125, and the potential of the accumulating unit 125, or these signals may be collectively referred to as a pixel signal.

Additionally remarking, the pixel 112 includes at least one photoelectric converting unit 104, and a pixel output unit 127 or the like as a reading unit configured to read an image signal from the at least one photoelectric converting unit 104 to the signal line 122. The pixel 112 can be referred to as a minimum unit of a circuit configured to output a pixel signal constituting an image to the signal line 122.

Figure 9:
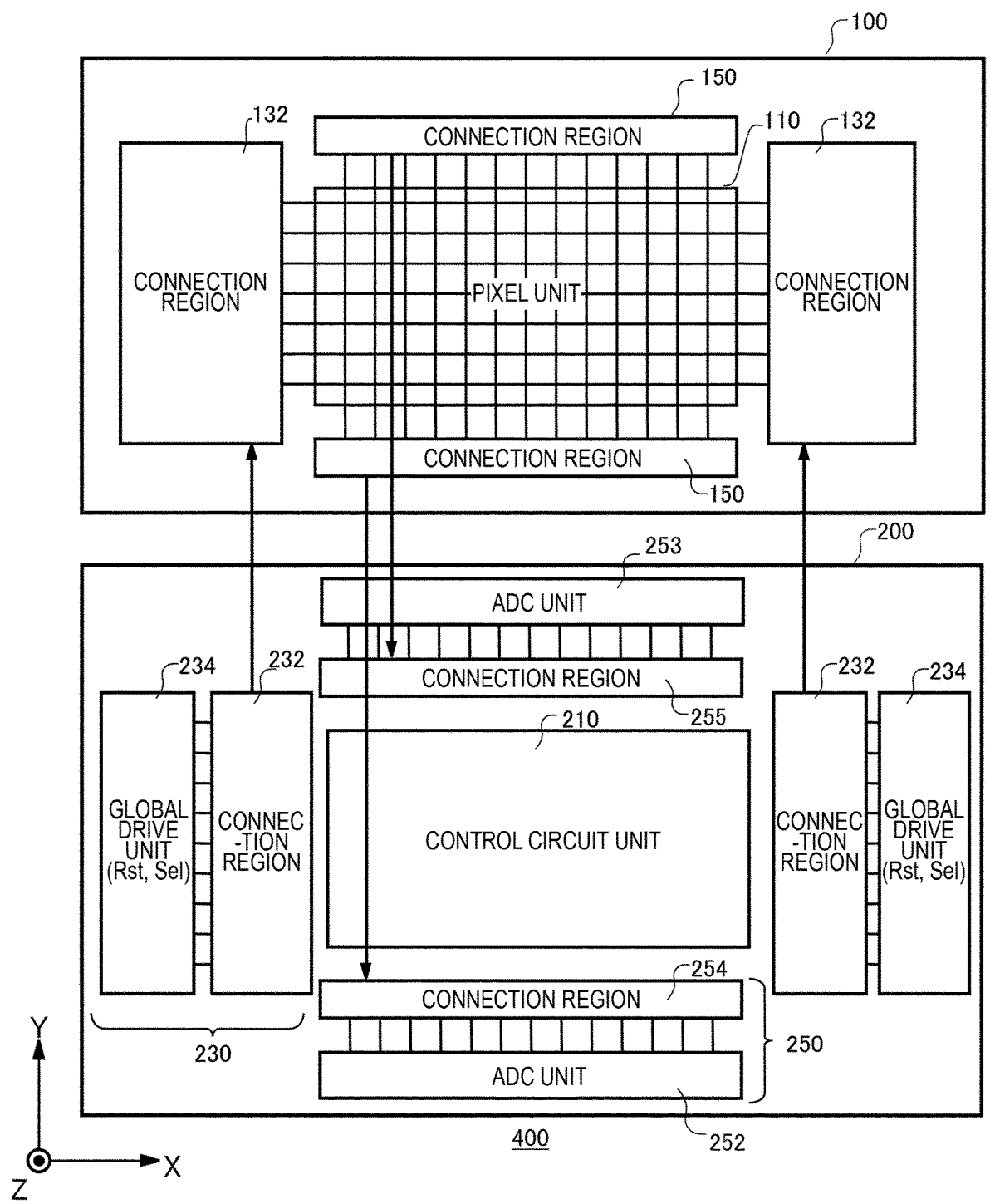
FIG. 9 illustrates an example of a wiring method of the image capturing device 400.
Figure 10:
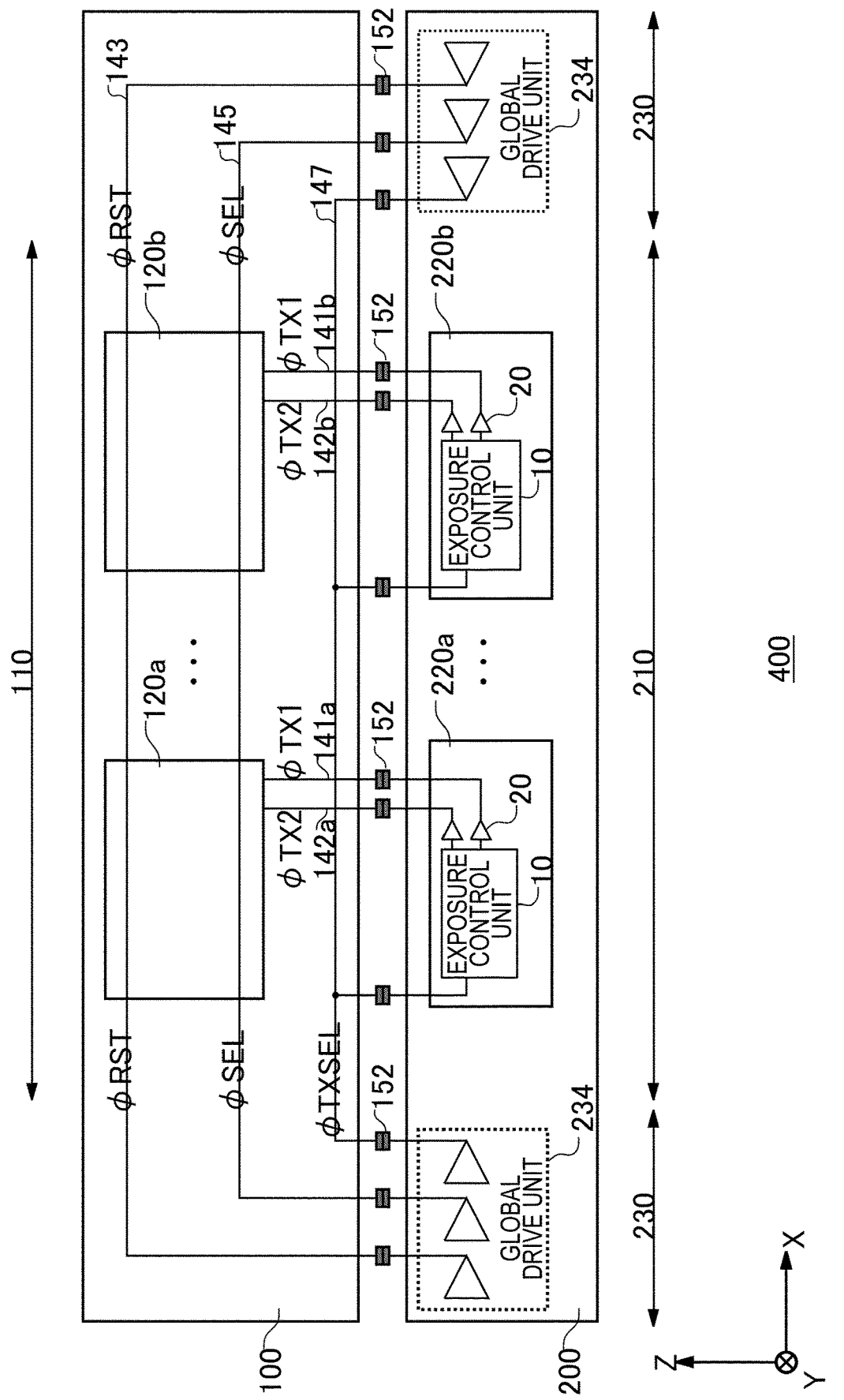
FIG. 10 illustrates an example of the wiring method of the image capturing device 400.
Figure 11:
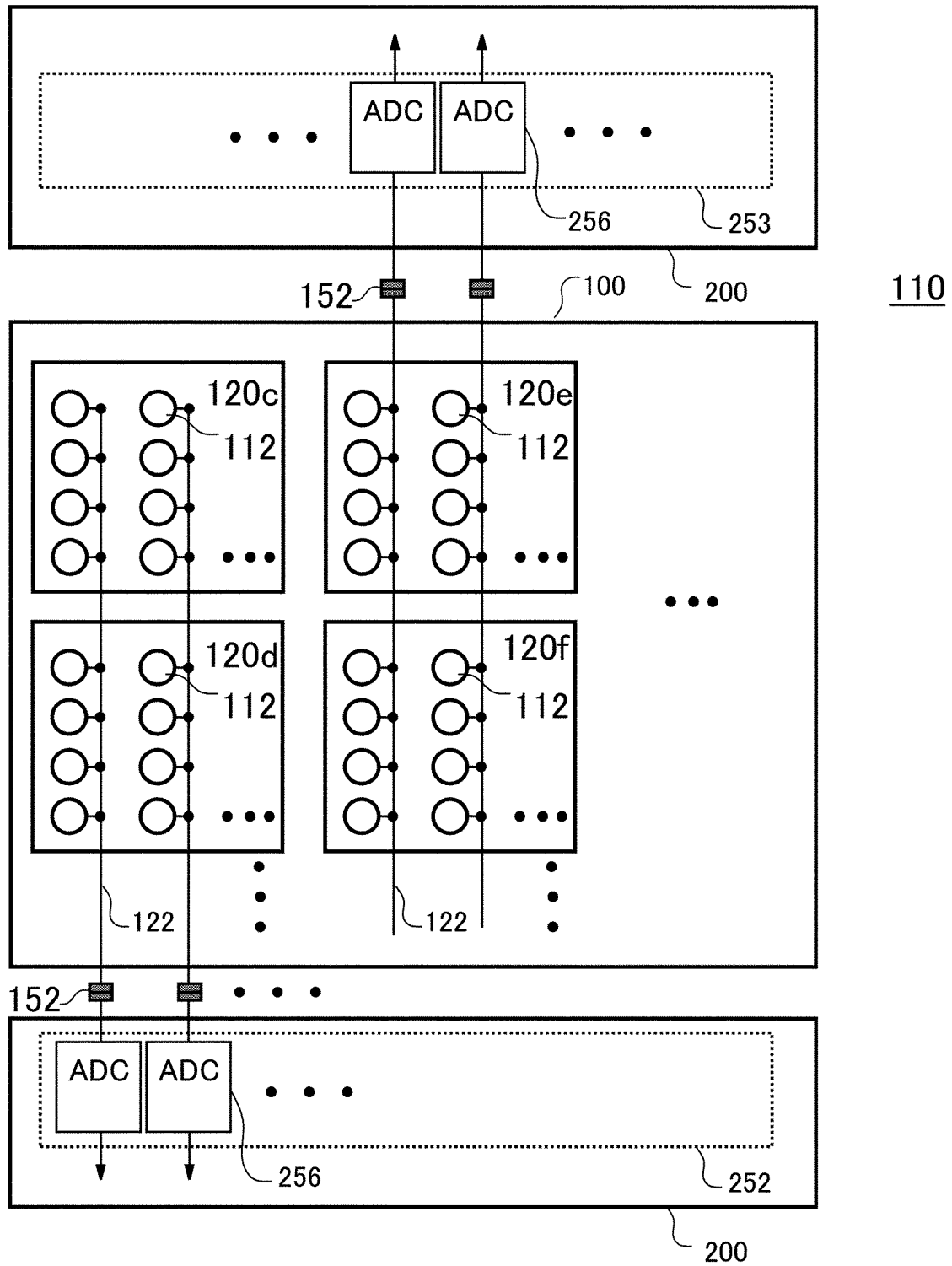
FIG. 11 illustrates an example of the wiring method of the image capturing device 400.

FIGS. 9, 10 and 11 illustrate an example of a wiring method of the image capturing device 400. Note that, in FIGS. 10 and 11, the connection regions are omitted for simplification of the drawings.

As shown in FIG. 9, the first substrate 100 has connection regions 132 and 150 provided at the periphery of the pixel unit 610 and electrically connected to the pixel unit 610. The second substrate 200 has connection regions 232 and 255 provided at the periphery of the control circuit unit 210 and electrically connected to the control circuit unit 210.

The pair of connection regions 132 is connected to the pair of connection regions 232 located at facing positions, respectively. The connection regions 132 and 232 connected to each other are configured to input a control signal from the global drive unit 234 to the pixel unit 610 by using the global control line.

The pair of connection regions 150 is connected to the pair of connection regions 254 and 255 located at facing positions, respectively. The connection regions 150 and 254 and 255 connected to each other are configured to input a pixel signal from the pixel unit 110 to corresponding ADC units 252 and 253 by using the common signal line.

As shown in FIG. 10, the global drive unit 234 is configured to output a reset control signal ΦRST, a selection control signal ΦSEL and a transfer selection control signal ΦTXSEL. The global drive unit 234 is connected to a reset control line 143 and a selection control line 145 configured to output a signal to each pixel block 120. The global drive unit 234 is configured to supply the reset control signal ΦRST to the plurality of pixel blocks 120 via the reset control line 143 and to supply the selection control signal ΦSEL via the selection control line 145. The global drive unit 234 is configured to supply the transfer selection control signal ΦTXSEL to the plurality of control blocks 220 via a transfer selection control line 147.

The transfer selection control signal ΦTXSEL is supplied from the global drive unit 234 to the control block 220 so as to control the exposure time of each pixel block 120. The control block 220 supplied with the transfer selection control signal ΦTXSEL is configured to output the transfer selection control signal ΦTXSEL to the corresponding pixel block 120. The pixel block 120 is configured to determine whether to input the transfer selection control signal ΦTXSEL to the pixel 112 as the transfer control signal ΦTX1 or the discharge control signal ΦTX2. Thereby, the input of the transfer control signal ΦTX1 or the discharge control signal ΦTX2 to the pixel 112 is skipped.

For example, the control block 220 is configured to extend the exposure time by skipping the transfer control signal ΦTX1 when the transfer control signal ΦTX1 determines an end time of exposure. In addition, the control block 220 can shorten the exposure time by skipping the transfer control signal ΦTX1 when the transfer control signal ΦTX1 determines a start time of exposure. In this way, the exposure time of the pixel block 120 can be adjusted by the transfer selection control signal ΦTXSEL. The same is true when the discharge control signal ΦTX2 determines the start time or end time of exposure.

The reset control line 143, the selection control line 145 and the transfer selection control line 147 are wired globally, i.e., provided in common to the plurality of pixel blocks 120. The reset control line 143, the selection control line 145, and the transfer selection control line 147 of the present example are wired across the pixel unit 110 in the row direction. The reset control line 143, the selection control line 145, and the transfer selection control line 147 may be wired across the pixel unit 110 in the column direction.

For example, the reset control line 143 is connected to a gate terminal of the reset unit 126 of the pixel block 120 and is configured to supply the reset control signal ΦRST. The selection control line 145 is connected to a gate terminal of the selecting unit 129 of the pixel block 120 and is configured to supply the selection control signal ΦSEL. In addition, the transfer selection control line 147 is connected to each of the plurality of control blocks 220 and is configured to supply the transfer selection control signal ΦTXSEL to the exposure control unit 10.

Note that, the global drive unit 234 of the present example is configured to output the transfer selection control signal ΦTXSEL from the second substrate 200 to the first substrate 100, but may also be configured to output the transfer selection control signal ΦTXSEL to the control block 220 without supplying the same to the first substrate 100. In this case, the transfer selection control line 147 is provided to the second substrate 200.

On the other hand, a transfer control line 141a and a discharge control line 142a are connected to a pixel block 120a. The transfer control line 141a of the present example is connected to the gate terminal of the transfer unit 123 provided to the pixel block 120a. The transfer control line 141a is configured to supply the transfer control signal ΦTX1 output from a control block 220a to the pixel block 120a. The discharge control line 142a of the present example is connected to the gate terminal of the outlet 124 provided to the pixel block 120a. The discharge control line 142a is configured to supply the discharge control signal ΦTX2 output from the control block 220a to the pixel block 120a.

A transfer control line 141b and a discharge control line 142b are connected to a pixel block 120b. The transfer control line 141b of the present example is connected to the gate terminal of the transfer unit 123 provided to the pixel block 120b. The transfer control line 141b is configured to supply the transfer control signal ΦTX1 output from a control block 220b to the pixel block 120b. The discharge control line 142b of the present example is connected to the gate terminal of the outlet 124 provided to the pixel block 120b. The discharge control line 142b is configured to supply the discharge control signal ΦTX2 output from the control block 220b to the pixel block 120b.

A plurality of bumps 152 is provided on a joining surface at which the first substrate 100 and the second substrate 200 are joined to each other. The bumps 152 of the first substrate 100 are positionally aligned with the bumps 152 of the second substrate 200. The plurality of bumps 152 facing each other are joined and thus electrically connected by a pressurization treatment or the like on the first substrate 100 and the second substrate 200. In this case, the bumps 152 of the global control line may be below the corresponding pixel block 120 or may be in the connection regions 132 and 232. On the other hand, the bumps 152 of the local control line are provided below the corresponding pixel block 120 (also above the control block 220).

The image capturing device 400 of the present example is configured to control the exposure time for each pixel block 120 by changing a timing of at least one of the transfer unit 123 and the outlet 124 by the local control line. The image capturing device 400 can implement control of the exposure time with fewer control lines by combining the local control line and the global control line.

As shown in FIG. 11, a common signal line 122 extending in the column direction is arranged for each column inside a pixel block 120c. In addition, the signal line 122 is also common to a plurality of pixel blocks 120c and 120d aligned in the column direction. Therefore, in the present example, m×M pixels 112 aligned in one column are connected to one signal line 122, and pixel signals from the pixels 112 are output thereto.

An ADC (analog digital converter) 256 on the second substrate 200 side is connected to each of the signal lines 122 via the bump 152. A plurality of ADCs 256 corresponding to the plurality of signal lines 122 constitute an ADC unit 252.

In the example of FIG. 11, the ADC unit 252 is provided with the ADCs 256 corresponding to the pixel blocks 120c and 120d in the odd column, and the ADC unit 253 is provided with the ADCs 256 corresponding to the pixel blocks 120e and 120f in the even column. However, the arrangement relationship between the pixel block 120c and the like and the corresponding ADC unit 252 and the like is not limited thereto.

With the above configuration, each ADC 256 is configured to convert pixel signals sequentially output from the connected m×M pixels 112 in one column into digital signals and to output the digital signals. In this case, the ADC units 252 and 253 as a whole are configured to convert pixel signals from the pixels 112 aligned in n×N columns in the row direction into digital signals in parallel. From this standpoint, the digital conversion can be referred to as a kind of so-called column ADC. Note that, although a single-slope ADC may be given as an example of the ADC, other digital converting methods may also be used. In addition, a connection position of each pixel 112 and the signal line 122 is not limited to the form shown in FIG. 11, and may be in each pixel block 120c or the like, as another example.

Figure 12:
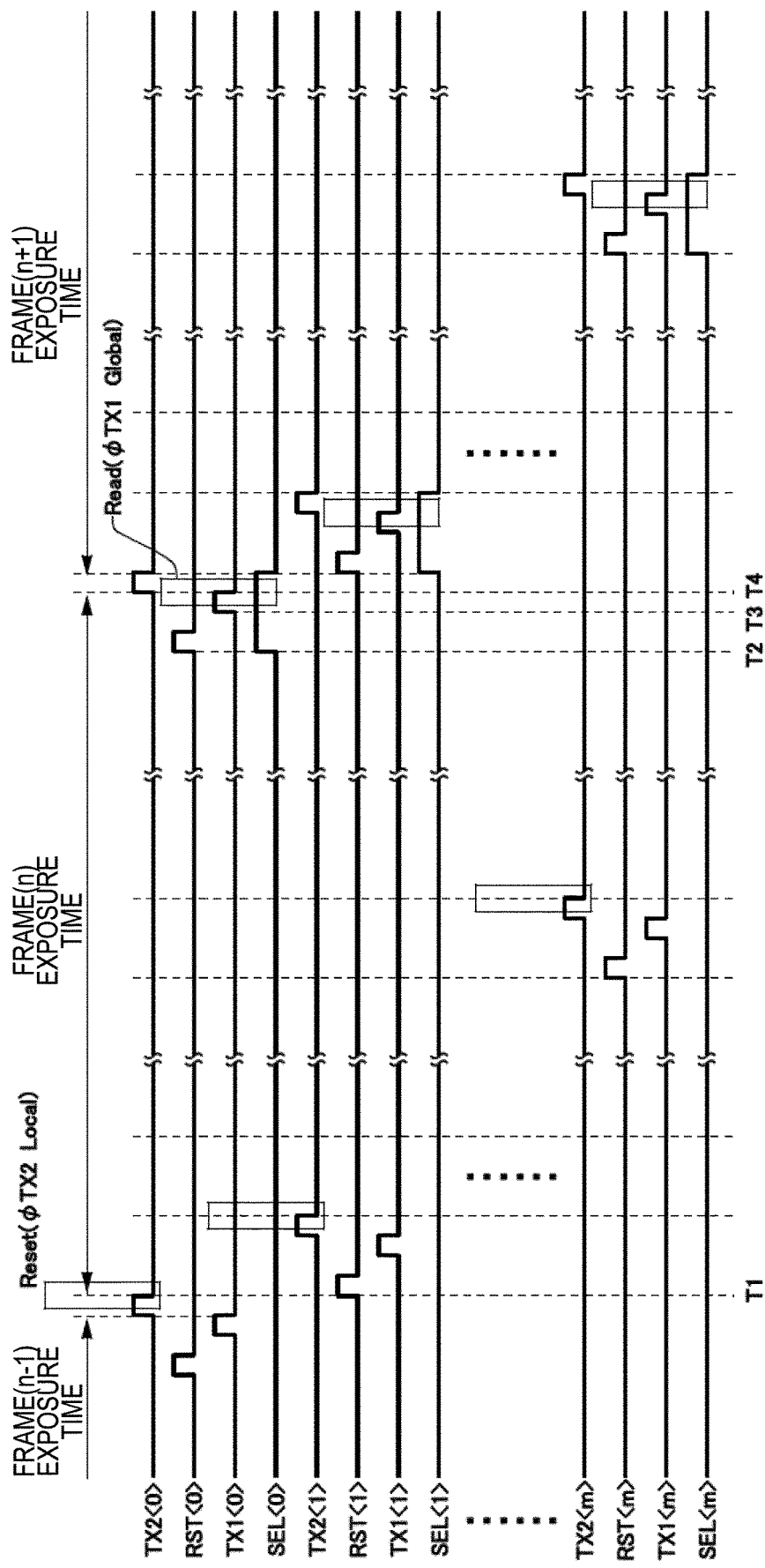
FIG. 12 shows an example of a timing chart showing an image capturing operation in a pixel block 120 of the image capturing device 400.

FIG. 12 shows an example of a timing chart showing an image capturing operation in the pixel block 120 of the image capturing device 400. In the present example, drive of the pixel block 120 is controlled by the transfer control signal ΦTX1, the discharge control signal ΦTX2, the reset control signal ΦRST, and the selection control signal ΦSEL.

The discharge control signal ΦTX2 controls a timing to start exposure. The start timing of exposure corresponds to a fall timing (for example, time T1) of the discharge control signal ΦTX2. That is, before start time T1 of exposure, the discharge control signal ΦTX2 turns on the outlet 124 to discharge the electric charges accumulated in the photoelectric converting unit 104, and exposure starts resulting from the fall of the discharge control signal ΦTX2. Since the discharge control signal ΦTX2 of the present example is locally controlled, the exposure time can be adjusted for each pixel block 120.

The transfer control signal ΦTX1 controls a timing to end exposure. At time T3, the transfer control signal ΦTX1 turns on the transfer unit 123 to transfer the electric charges accumulated in the photoelectric converting unit 104 to the accumulating unit 125. The end timing of exposure corresponds to a fall timing (for example, time T4) of the transfer control signal ΦTX1.

The reset control signal ΦRST controls a discharge timing of the electric charges accumulated in the accumulating unit 125. At time T2, the reset control signal ΦRST turns on the reset unit 126 to discharge the electric charges of the accumulating unit 125. In the present example, by discharging the electric charges of the accumulating unit 125 before the end timing of exposure, it is possible to suppress an influence of the electric charges remaining in the accumulating unit 125 at the time of transferring the electric charges from the photoelectric converting unit 104.

The selection control signal ΦSEL is a signal for selecting an arbitrary pixel 112. The selection control signal ΦSEL controls on/off of the selecting unit 129. At time T2, the selection control signal ΦSEL is set high. At time T3, the pixel 112 for which the selection control signal ΦSEL is set high outputs a pixel signal to the signal line 122, in response to turn-on of the transfer control signal ΦTX1. On the other hand, the pixel 112 for which the selection control signal ΦSEL is not set high does not output a pixel signal.

The image capturing device 400 of the present example can control the exposure time for each pixel block 120 by locally controlling the discharge control signal ΦTX2 to change the start timing of exposure for each pixel block 120. In addition, the image capturing device 400 may control the end timing of exposure for each pixel block 120 by locally controlling the transfer control signal ΦTX1. The image capturing device 400 may control both the start timing and end timing of exposure for each pixel block 120 by locally controlling both the transfer control signal ΦTX1 and the discharge control signal ΦTX2.

A pixel signal of each pixel 112 corresponds to an amount of electric charges accumulated in the photoelectric converting unit 104. Therefore, controlling the exposure timing of the pixel 112 can be referred to as controlling a timing of electric charge accumulation in the photoelectric converting unit 104. More specifically, controlling the exposure timing of the pixel 112 can be referred to as controlling a timing and a length of an electric charge accumulation time from discharge to transfer of electric charges.

Figure 13:
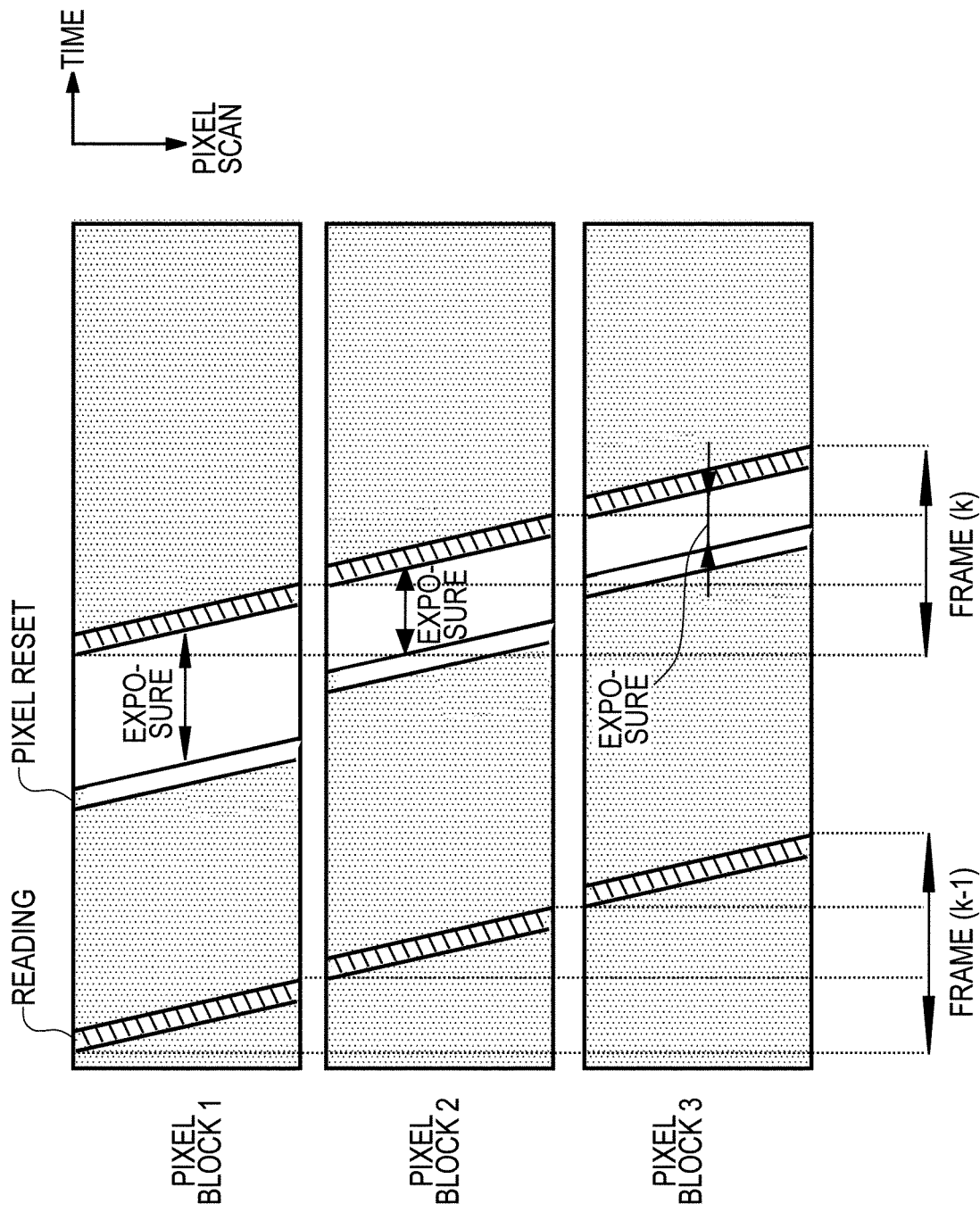
FIG. 13 shows an example of an exposure timing for each pixel block 120.

FIG. 13 shows an example of an exposure timing for each pixel block 120. In the present example, for the three pixel blocks 120 aligned in one column, the exposure time is controlled for each of the pixel blocks 120. Here, the image capturing device 400 changes an amount of exposure by shifting a time of pixel reset for each pixel block 120.

On the other hand, a reading timing of the pixel signal is in order from the pixel block 120 above. That is, the pixel signal is read from the pixel 112 of "pixel block 1", then the pixel signal is read from the pixel 112 of "pixel block 2", and then the pixel signal is read from the pixel 112 of "pixel block 3".

Further, also in the pixel block 120, the pixel signals are sequentially read from the pixel 112 in the upper row, as described with reference to FIG. 12. Therefore, when seeing the pixel unit 110 as a whole, the pixel signals are sequentially read from the upper row of the m×M pixels 112 in the same column connected to the common signal line 122. In other words, the global drive unit 234 sets the selection control signal ΦSEL to high row by row over the plurality of pixel blocks 120 aligned in one column from the first row to the m×M-th row.

In this case, as described with reference to FIG. 11, for a plurality of pixel blocks 120 aligned in one row, the common selection control line 145 is connected to n×N pixels aligned in the same row. Therefore, the pixel signals are read in parallel from the n×N pixels 112 connected to the row for which the selection control signal ΦSEL is set high. Thereby, pixel signals of one frame can be output.

The pixel signals are digitally converted by the ADC units 252 and 252, as described with reference to FIG. 11. The digital-converted pixel signals are output to subsequent image processing to form an image of one frame.

As described above, from the standpoint that the pixel signals are sequentially read from the upper row of the same column among the plurality of pixel blocks 120, the reading method of the present embodiment can be referred to as a so-called rolling shutter method for the entire pixel unit 110. However, additionally remarking, even in this case, it is possible to set a different exposure time for each pixel block 120.

As described above, according to the present embodiment, among the plurality of pixel blocks 120 aligned in one column, after reading the pixel signals from the pixels 112 of the pixel block 120 above, the pixel signals are read from the pixels 112 of the pixel block 120 below. Therefore, when capturing a moving photographic subject, the distortion of an image due to the reading order is smoothed, and the viewer's sense of discomfort with respect to the image can be reduced. More specifically, when reading a moving photographic subject in parallel from a plurality of pixel blocks 120 aligned in one column, a plurality of serrated steps corresponding to gaps between the pixel blocks 120 appear in the vertical direction of the image (i.e., corresponding to the column direction of the pixels), thereby causing a sense of discomfort to the viewer. In contrast, according to the present embodiment, the plurality of steps do not appear in the image.

In addition, in the present embodiment, the signal processing unit 250 is arranged outside the control circuit unit 210 without providing the ADC unit within the control block 220. Therefore, an area of the control block 220 can be reduced, and a size of the pixel block 120 to be arranged at a position corresponding to the control block 220 can be reduced, i.e., the exposure control by the control block 220 can be performed in a unit of the small number of pixels. Thereby, it is possible to finely control the exposure time within the image, and to make boundaries of the pixel blocks 120 inconspicuous on the image. Further, since the digital converting is not performed immediately below the pixel 112, an influence of noise on the pixels 112 due to heat generation can be suppressed.

Note that, the signal processing units 250 may not be provided in a plurality of spaced regions, and may be provided in one region for the entire pixel unit 110.

Figure 14:
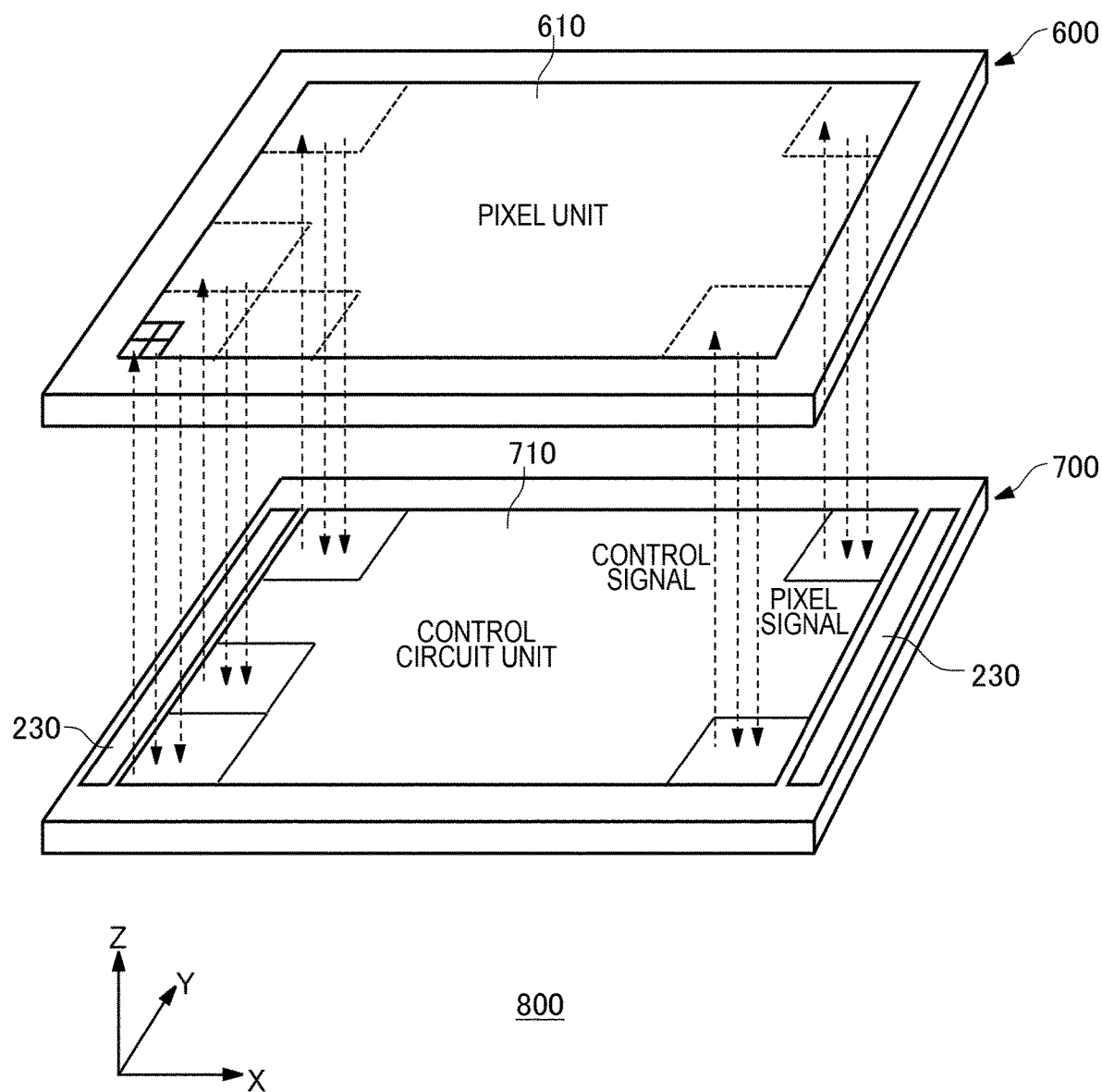
FIG. 14 shows an outline of an image capturing device 800 according to another embodiment.

FIG. 14 shows an outline of an image capturing device 800 according to another embodiment. In the image capturing device 800, the same configurations as the image capturing device 400 are denoted with the same reference signs, and the descriptions thereof are omitted.

The image capturing device 800 includes a first substrate 600 and a second substrate 700. As shown in FIG. 14, the first substrate 600 is stacked on the second substrate 700.

Similar to the image capturing device 400, the first substrate 600 has a pixel unit 610 and the second substrate 700 has a control circuit unit 210 and a peripheral circuit unit 230. On the other hand, the connection region 150 of the first substrate 100 is not provided at the periphery of the pixel unit 610 of the first substrate 600. In addition, the signal processing unit 250 of the second substrate 200 is not provided at the periphery of the control circuit unit 710 of the second substrate 700.

A pixel signal output from the first substrate 100 is input to the control circuit unit 710. The control circuit unit 710 is configured to process the input pixel signal. The control circuit unit 710 of the present example is arranged at a position on the second substrate 200, which faces the pixel unit 610. The control circuit unit 710 is further configured to output a control signal for controlling drive of the pixel unit 610 to the pixel unit 610.

Figure 15:
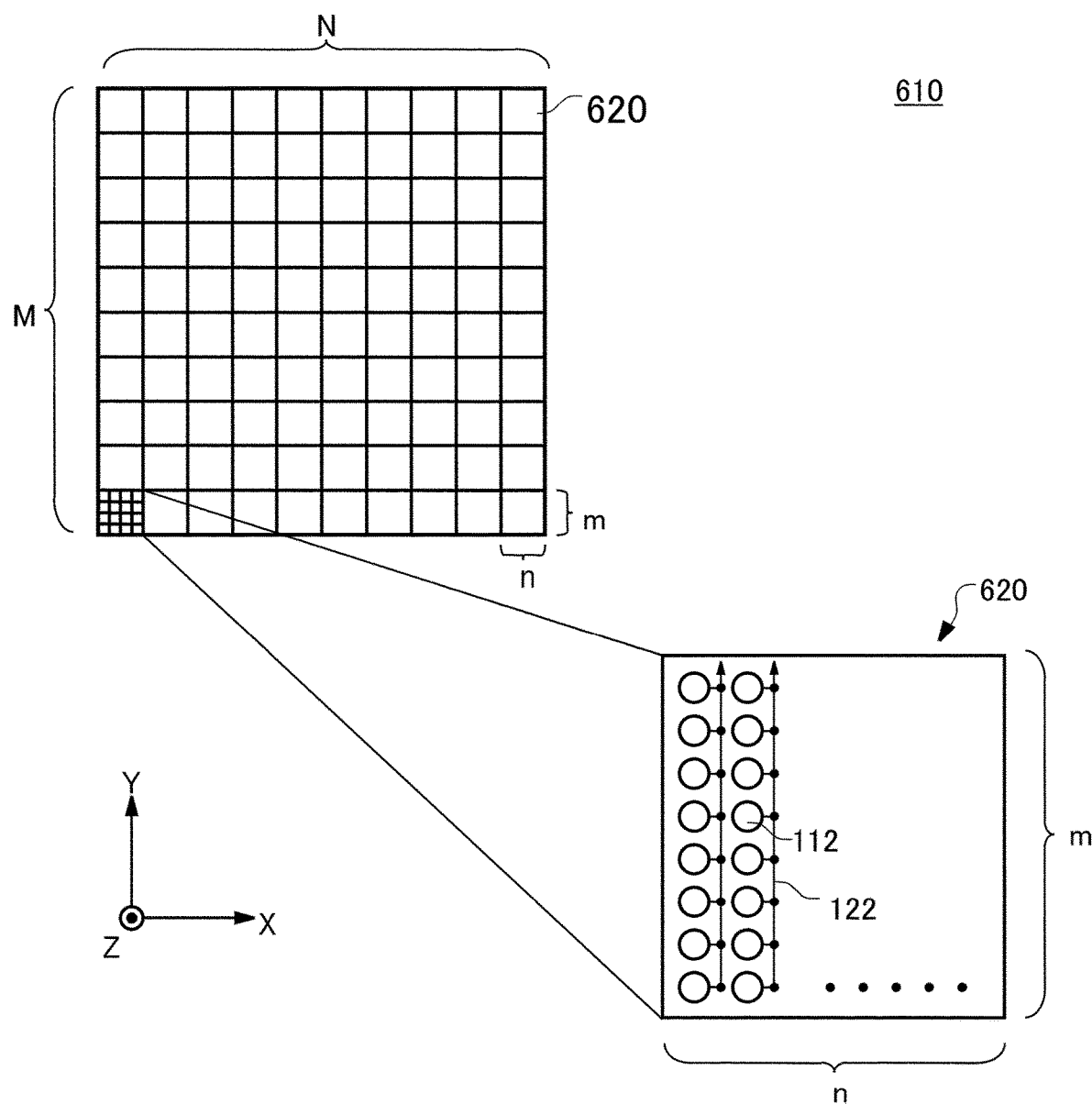
FIG. 15 shows an example of a specific configuration of a pixel unit 610.

FIG. 15 shows an example of a specific configuration of the pixel unit 610. Similar to the pixel unit 110, the pixel unit 610 has M×N pixel blocks 620, and the pixel block 620 has m×n pixels 112, and the configuration of the pixels 112 is similar to that of the pixel unit 110.

The configuration where the pixels 112 aligned in one column within the pixel block 620 are connected to the common signal line 122 is similar to that of the pixel block 120. On the other hand, the signal line 122 is not common among the plurality of pixel blocks 620, and is independent of each other.

Figure 16:
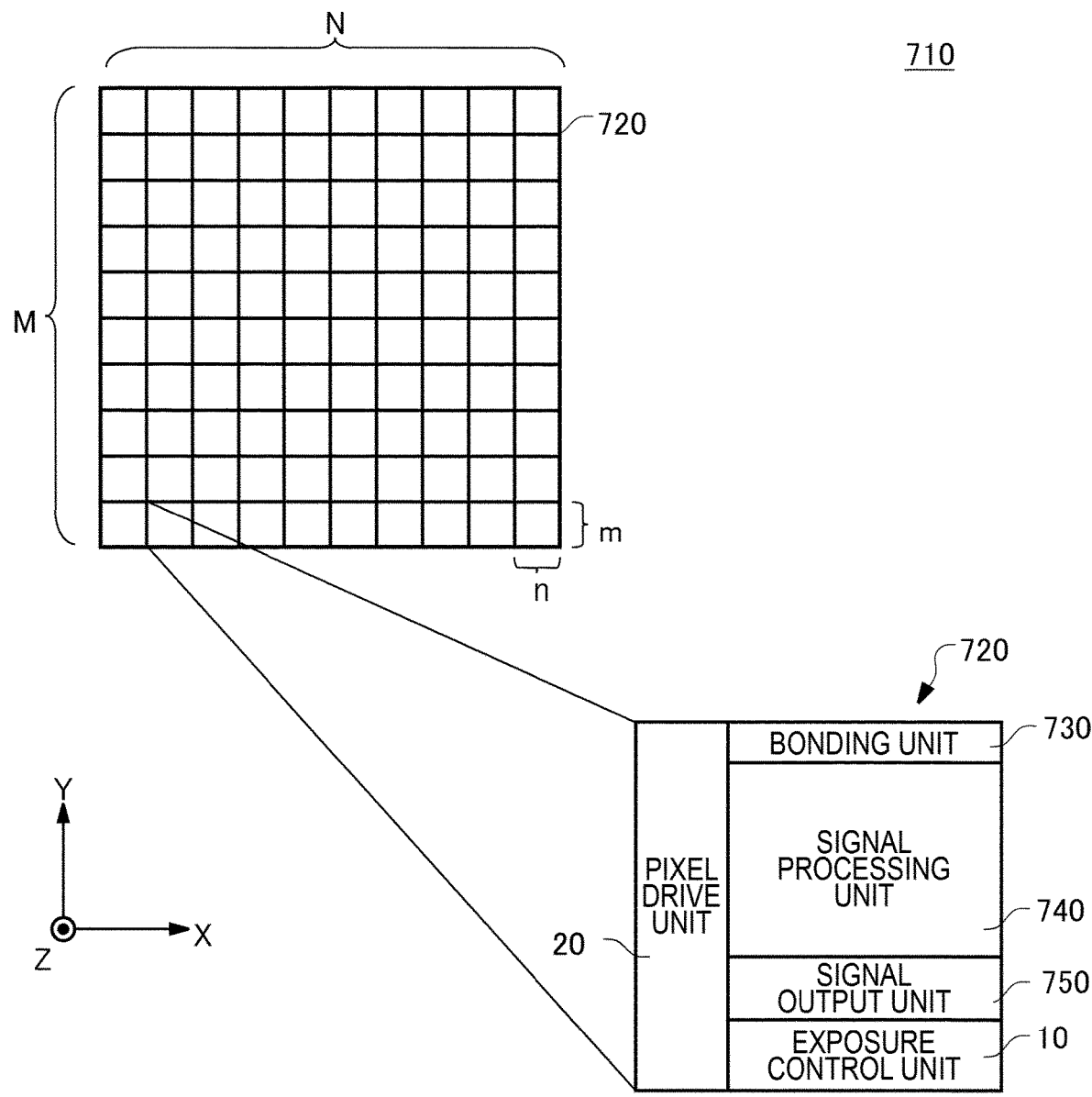
FIG. 16 shows an example of a more specific configuration of a control circuit unit 710.

FIG. 16 shows an example of a more specific configuration of the control circuit unit 710. Similar to the control circuit unit 210, the control circuit unit 710 has the M×N control blocks 720, which are arranged at positions corresponding to the pixel blocks 620, respectively.

The control block 720 includes an exposure control unit 10 and a pixel drive unit 20, which are similar to those of the control block 220. The control block 720 further includes a joining unit 730, a signal processing unit 740 and a signal output unit 750.

The joining unit 730 is configured to join the first substrate 600 and the second substrate 700 each other. The joining unit 730 is configured to input a pixel signal input from the first substrate 600 to the signal processing unit 740. The joining unit 730 is provided corresponding to the n pixels 112 arranged in the row direction, and is configured to input a pixel signal to the signal processing unit 740 for each column.

The signal processing unit 740 is configured to digitally convert an analog signal output by the pixel unit 610. The signal processing unit 740 of the present example is configured to convert an analog pixel signal into a digital signal. The signal processing unit 740 is configured to digitally convert sequentially analog signals from the m pixels 112 aligned in the column direction. The signal processing unit 740 has ADCs of a number corresponding to the number of columns of the corresponding pixel blocks 120, and is configured to digitally convert analog signals from the pixels 112 aligned in n columns in the row direction in parallel by using the ADCs.

The signal output unit 750 is configured to receive the digital signal from the signal processing unit 740. In an example, the signal output unit 750 is configured to temporarily store the digital signal. The signal output unit 750 may have a latch circuit for storing a digital signal. The signal output unit 750 is provided between the signal processing unit 740 and the exposure control unit 10 in the column direction, and is configured to output a digital signal. The signal output unit 750 of the present example is configured to output a digital signal to an outside of the control circuit unit 710.

The control block 720 of the present example has therein the signal processing unit 740 and the signal output unit 750. That is, a circuit configured to digitally convert a pixel signal is arranged within the control circuit unit 710, and is not arranged outside.

Since the image capturing device 800 of the present example can set an exposure time for each pixel block 620 according to the intensity of incident light, a dynamic range can be expanded, which is similar to the image capturing device 400. The image capturing device 800 can further read pixel signals in parallel for each pixel block 620 by the control block 720 provided for each pixel block 620. However, in the present embodiment, the reading timing is controlled, as described later.

Figure 17:
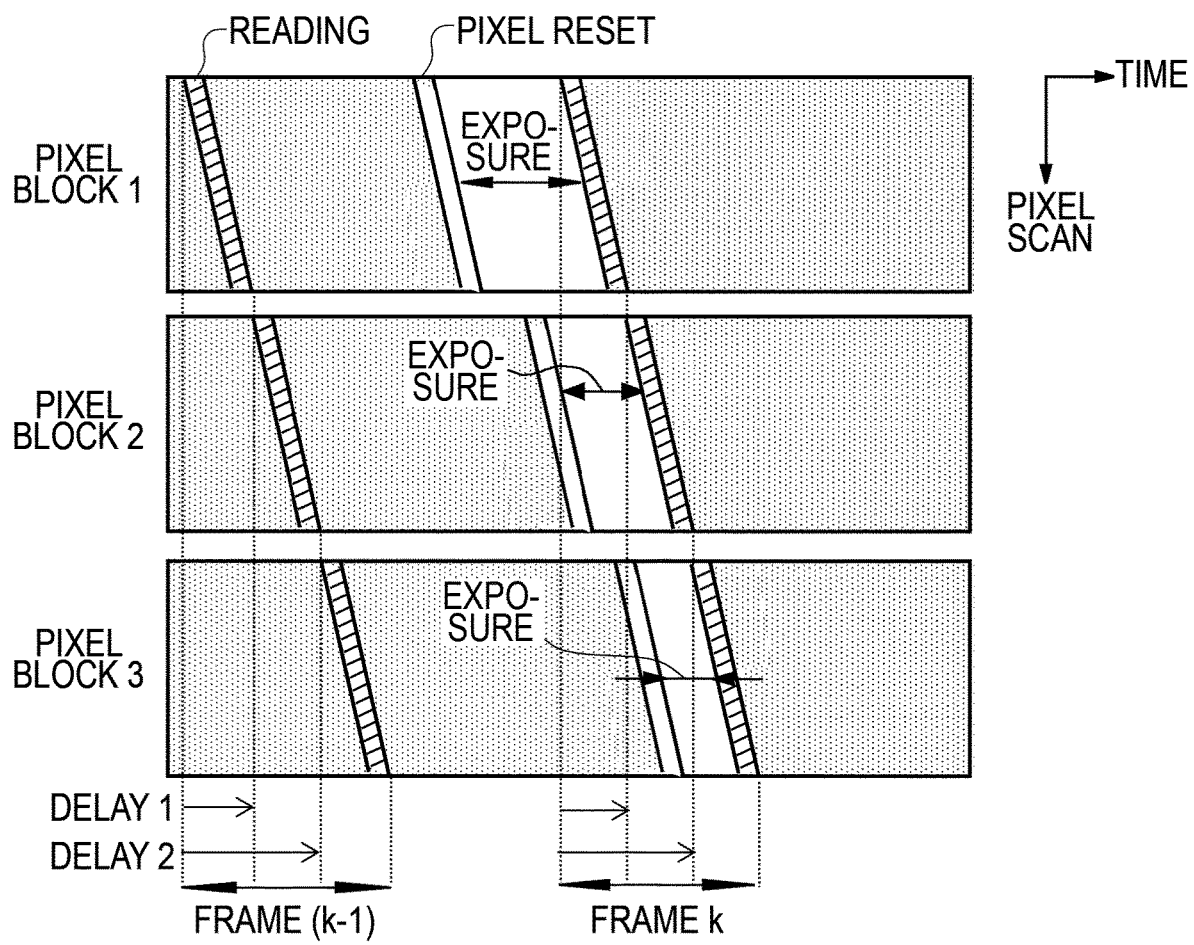
FIG. 17 shows an example of an exposure timing for each pixel block 620.

FIG. 17 shows an example of an exposure timing for each pixel block 620. In the present example, for the three pixel blocks 620 aligned in one column, the exposure time is controlled for each of the pixel blocks 620. Here, the image capturing device 800 changes an amount of exposure by shifting a time of pixel reset for each pixel block 620, as with the image capturing device 400.

On the other hand, the reading timing of the pixel signal is in order from the pixel block 620 above. That is, the pixel signal is read from the pixel 112 of "pixel block 1", then the pixel signal is read from the pixel 112 of "pixel block 2", and then the pixel signal is read from the pixel 112 of "pixel block 3".

Further, also in the pixel block 620, the pixel signals are sequentially read from the pixel 112 in the upper row, as with the image capturing device 400. Therefore, when seeing the pixel unit 110 as a whole, the pixel signals are sequentially read from the upper row of the m×M pixels 112 in the same column connected to the common signal line 122.

In the image capturing device 800, the corresponding signal line 122 and signal processing unit 740 are provided for each of the plurality of pixel blocks 620. More specifically, the corresponding signal line 122 and ADC of the signal processing unit 740 are provided for each column of the plurality of pixel blocks 620. Therefore, the pixel signals can be read simultaneously even among the plurality of pixel blocks 620 aligned in the column direction. However, in the present embodiment, the global drive unit 234 sets the selection control signal ΦSEL to high row by row over the plurality of pixel blocks 120 aligned in one column from the first row to the m×M-th row.

Thereby, as shown in FIG. 17, as with FIG. 13, among the plurality of pixel blocks 120 aligned in one column, after reading the pixel signals from the pixels 112 of the pixel block 120 above, the pixel signals are read from the pixels 112 of the pixel block 120 below.

As described above, resultantly similar to the image capturing device 400, from the standpoint that the pixel signals are sequentially read from the upper row of the same column among the plurality of pixel blocks 620, the reading method of the present embodiment can also be referred to as a so-called rolling shutter method for the entire pixel unit 610. However, even in this case, a different exposure time can be set for each pixel block 620, as with the image capturing device 400. Thereby, even in the image capturing device 800, when capturing a moving photographic subject, the distortion of an image due to the reading order is smoothed, and the viewer's sense of discomfort with respect to the image can be reduced, as in the case of the image capturing device 400.

Figure 18:
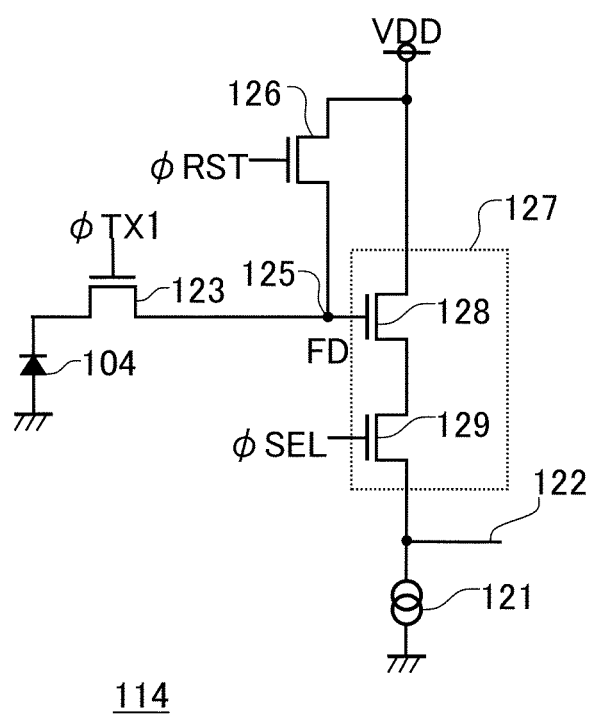
FIG. 18 shows another example of a pixel 114 of the image capturing devices 400, 800.

FIG. 18 shows another example of a pixel 114 of the image capturing devices 400 and 800. In the pixel 114, the same configurations as those of the pixel 112 are denoted with the same reference signs, and the descriptions thereof are omitted. The pixel 114 is not provided with the outlet 124, which is provided to the pixel 112. The pixel 114 may be referred to as a four-transistor type.

Figure 19:
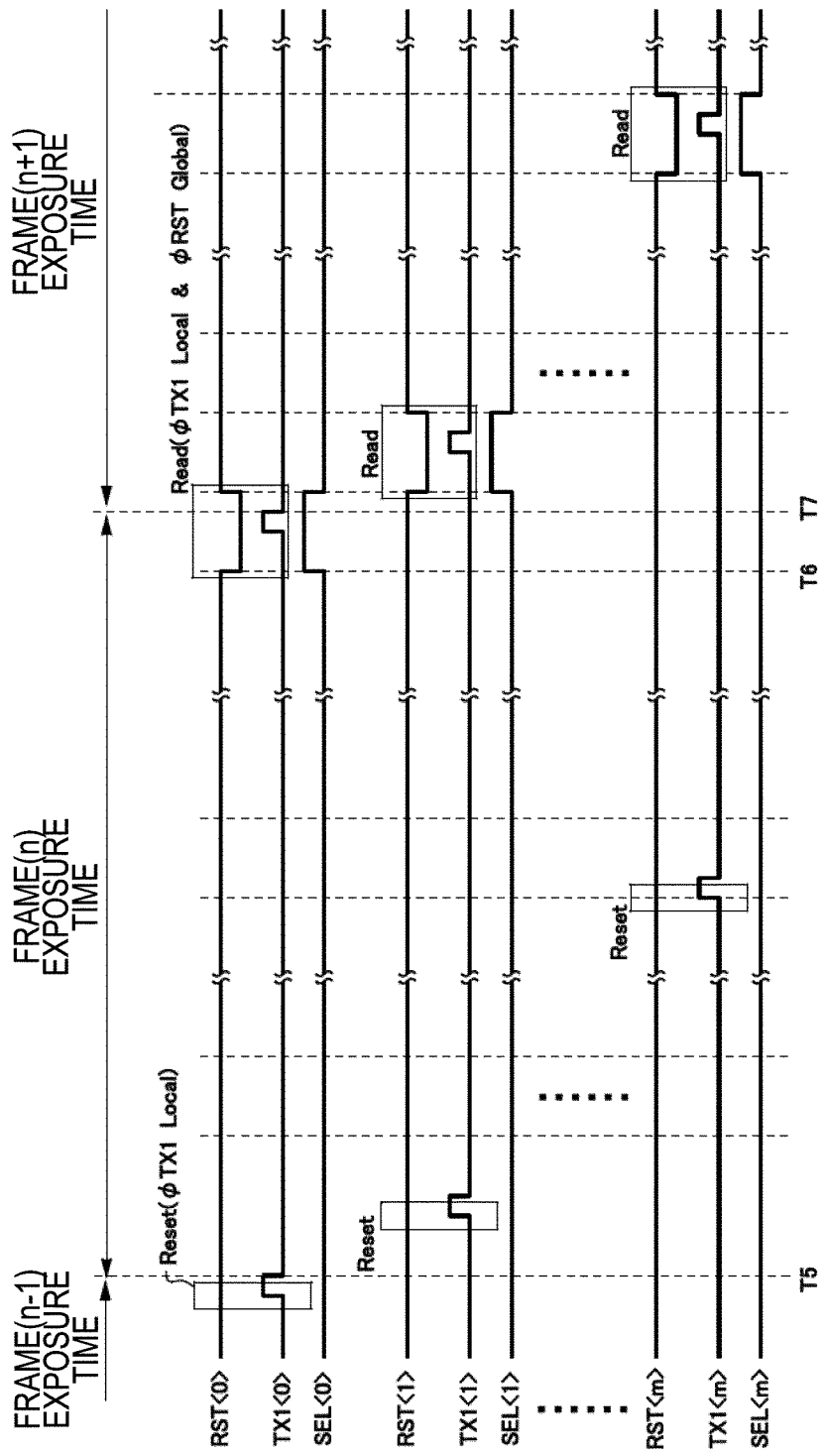
FIG. 19 shows an example of a timing chart showing an image capturing operation in the pixel block 120 using the pixel 114.

FIG. 19 shows an example of a timing chart showing an image capturing operation in the pixel block 120 using the pixel 114. In the present example, drive of the image capturing device 400 is controlled by the transfer control signal ΦTX1, the reset control signal ΦRST, and the selection control signal ΦSEL. The present example is different from the case of FIG. 12, in that the image capturing device 400 controls the start timing of exposure by the transfer control signal ΦTX1. In the present example, differences from FIG. 12 will be particularly described.

The transfer control signal ΦTX1 controls the start timing and end timing of exposure. In frame (n), exposure starts at time T5 and ends at time T7.

At start time T5 of exposure, the exposure starts as the transfer control signal ΦTX1 falls. That is, before start time T5 of exposure, the transfer control signal ΦTX1 turns on the transfer unit 123 to discharge the electric charges accumulated in the photoelectric converting unit 104 in a state in which the reset control signal ΦRST is on, and exposure starts resulting from the fall of the transfer control signal ΦTX1. Since the transfer control signal ΦTX1 of the present example is a locally controlled signal, it is also possible to change the timing to start exposure in each pixel block 120.

In addition, at end time T7 of exposure, the exposure ends as the transfer control signal ΦTX1 falls. That is, before end time T7 of exposure, the transfer control signal ΦTX1 turns on the transfer unit 123 to transfer the electric charges accumulated in the photoelectric converting unit 104 to the accumulating unit 125 in a state in which the reset control signal ΦRST is off, and exposure ends resulting from the fall of the transfer control signal ΦTX1. Since the transfer control signal ΦTX1 of the present example is a locally controlled signal, it is also possible to change the timing to end exposure in each pixel block 120.

The selection control signal ΦSEL is a signal for selecting an arbitrary pixel 114. At time T6, the pixel 114 for which the selection control signal ΦSEL is set high outputs a pixel signal to the signal line 122.

The reset control signal ΦRST controls a discharge timing of the electric charges accumulated in the accumulating unit 125. The reset control signal ΦRST may be a globally controlled signal. Since the reset control signal ΦRST is always on except the timing of reading, the electric charges are not accumulated in the accumulating unit 125. On the other hand, by turning off the reset control signal ΦRST and turning on the transfer control signal ΦTX1 at the timing of reading, the electric charges are transferred from the photoelectric converting unit 104 to the accumulating unit 125. The reset control signal ΦRST of the present example has the same switching timing at the time of reading, and therefore, can be shared with a pulse of the selection control signal ΦSEL.

Figure 20:
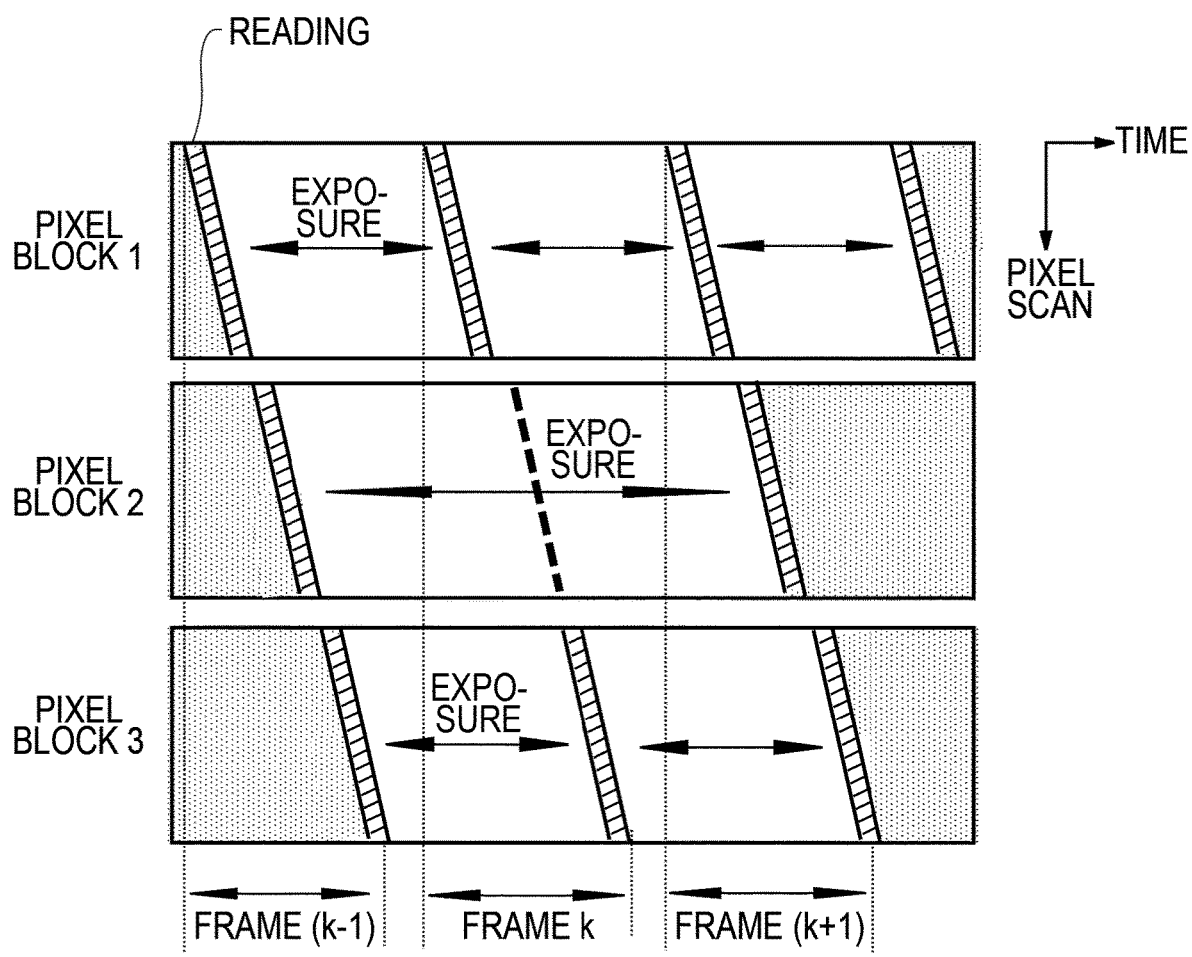
FIG. 20 shows an example of an exposure timing for each pixel block 120 using the pixel 114.

FIG. 20 shows an example of an exposure timing for each pixel block 120 using the pixel 114. In the pixel 114, as described with reference to FIG. 19, the reset operation is performed during a reading operation period of the pixel signal. Therefore, in FIG. 20 and its description, the reading timing will be described, and the description of the reset timing will be omitted.

In FIG. 20, the reading timing of the pixel signal is in order from the pixel block 120 above, as with FIG. 13. That is, the pixel signal is read from the pixel 114 of "pixel block 1", then the pixel signal is read from the pixel 114 of "pixel block 2", and then the pixel signal is read from the pixel 114 of "pixel block 3".

Further, also in the pixel block 120, the pixel signals are sequentially read from the pixel 114 in the upper row. Therefore, when seeing the pixel unit 110 as a whole, the pixel signals are sequentially read from the upper row of the m×M pixels 114 in the same column connected to the common signal line 122.

As described above, resultantly similar to the case where the pixels 112 are used, from the standpoint that the pixel signals are sequentially read from the upper row of the same column among the plurality of pixel blocks 120, the reading method of the present embodiment can also be referred to as a so-called rolling shutter method for the entire pixel unit 110.

Further, in FIG. 20, a specific pixel block 120 is not read (which can also be referred to as skipped, omitted, thinned out, and the like) in a specific frame. This makes it possible to change the exposure time for each pixel block 120.

For example, in the example of FIG. 20, "pixel block 1" and "pixel block 3" are read in "frame k", but "pixel block 2" is not read. In next "frame k+1", any of "pixel block 1", "pixel block 2" and "pixel block 3" is read. Therefore, in "frame k+1", the exposure time of "pixel block 2" becomes longer than the exposure times of "pixel block 1" and "pixel block 3". Here, if a temporal frame rate of reading is constant, for a specific pixel block 120, when the reading is skipped n times, the exposure time increased by (n+1) times can be set.

Note that, the form in which a specific pixel block 120 is not read in a specific frame can also be applied to the image capturing devices 400 and 800 using the pixels 112. In this case, if the start timing of exposure by the discharge control signal ΦTX2 is set immediately after the reading timing, the same operation as that of FIG. 20 is possible. On the other hand, when the start timing of exposure by the discharge control signal ΦTX2 is controlled independently of the reading timing, it is possible to perform a reading operation in which the reading in FIG. 13 and the reading in FIG. 20 are combined. That is, while controlling the start timing of exposure for each pixel block 120, as shown in FIG. 13, it is selected whether to perform the reading on a specific frame for each pixel block 120, as shown in FIG. 20. Thereby, it is possible to set the exposure time more dynamically and finely for each pixel block 120, and to reduce the viewer's sense of discomfort with respect to the image when capturing a moving photographic subject.

In any of the embodiments described above, the accumulating unit 125 and the pixel output unit 127 may be shared with other pixels. In addition, the pixel 112 may be configured by a plurality of photoelectric converting units 104 and transfer units 123.

Figure 21:
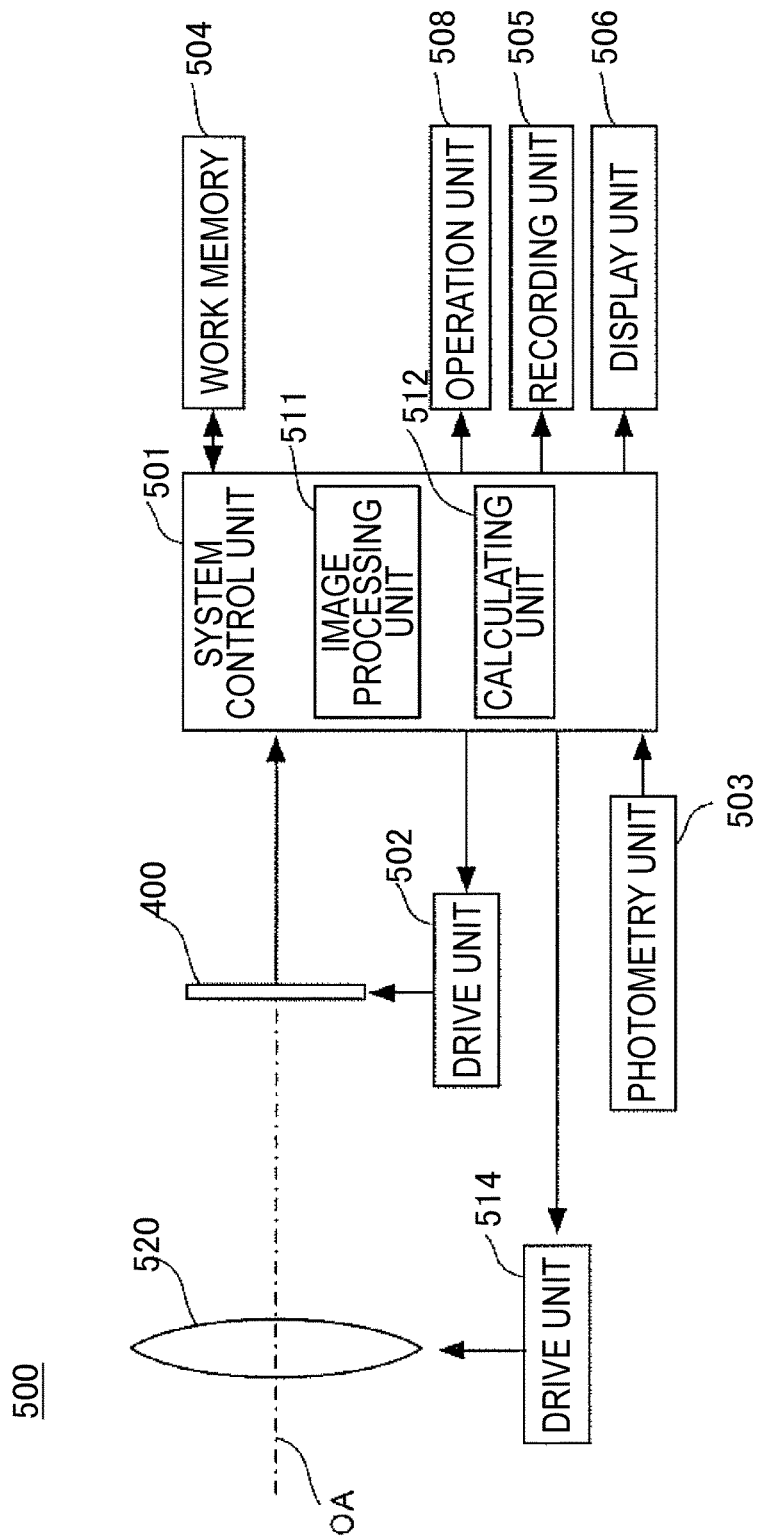
FIG. 21 is a block diagram showing a configuration example of an image capturing apparatus 500 according to an embodiment.

FIG. 21 is a block diagram showing a configuration example of an image capturing apparatus 500 according to an embodiment. The image capturing apparatus 500 includes the image capturing device 400, a system control unit 501, a drive unit 502, a photometry unit 503, a work memory 504, a recording unit 505, a display unit 506, a drive unit 514, and a photographing lens 520. An example in which the image capturing device 400 is provided will be described, but the image capturing device 800 may be provided instead.

The photographing lens 520 is configured to guide a photographic subject-emanating light flux incident along an optical axis OA to the image capturing device 400. The photographing lens 520 includes a plurality of optical lens groups, and is configured to form an image of the photographic subject-emanating light flux from a scene, in the vicinity of a focal plane of the photographing lens. The photographing lens 520 may be a replaceable lens that can be attached and detached with respect to the image capturing apparatus 500. Note that, in FIG. 21, the photographing lens 520 is represented by one virtual lens arranged near the pupil.

The drive unit 514 is configured to drive the photographing lens 520. In an example, the drive unit 514 is configured to move the optical lens group of the photographing lens 520 to change a focusing position. In addition, the drive unit 514 may be configured to drive an iris diaphragm in the photographing lens 520 to control a light amount of the photographic subject-emanating light flux incident on the image capturing device 400.

The drive unit 502 has a control circuit configured to execute electric charge accumulating control such as timing control and area control of the image capturing device 400 according to instructions from the system control unit 501. In addition, the operation unit 508 is configured to receive an instruction from a photographer using a release button or the like.

The image capturing device 400 is configured to transfer pixel signals to the image processing unit 511 of the system control unit 501. The image processing unit 511 is configured to generate image data by performing various image processing using the work memory 504 as a work space. For example, when generating image data of a JPEG file format, compression processing is executed after generating a color video signal from a signal obtained with the Bayer array. The generated image data is recorded in the recording unit 505, converted into a display signal, and displayed on the display unit 506 for a preset time.

The photometry unit 503 is configured to detect a luminance distribution of a scene prior to a series of photographing sequences for generating image data. The photometry unit 503 includes, for example, an AE sensor with approximately one million pixels. A calculating unit 512 of the system control unit 501 is configured to receive an output of the photometry unit 503 and to calculate a luminance for each area of the scene.

The calculating unit 512 is configured to determine a shutter speed, an aperture value, and an ISO sensitivity according to the calculated luminance distribution. The photometry unit 503 may also be used by the image capturing device 400. Note that, the calculating unit 512 is also configured to execute various calculations for operating the image capturing apparatus 500. The drive unit 502 may be partially or entirely mounted on the image capturing device 400. A part of the system control unit 501 may be mounted on the image capturing device 400.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order. The invention described in the present specification can also be implemented by forms described in following items.

(Item 1)
 An image capturing device comprising:
 a plurality of pixels,
 a first control line connected to a first pixel of the plurality of pixels, a control signal for controlling the first pixel being output to the first control line,
 a second control line connected to a second pixel of the plurality of pixels, a control signal for controlling the second pixel being output to the second control line, and a third control line connected to the first pixel and the second pixel, a control signal for controlling the first pixel and the second pixel being output to the third control line.

(Item 2)

The image capturing device according to Item 1, wherein each of the plurality of pixels includes:
a photoelectric converting unit configured to photoelectrically convert light and to generate electric charges,
a transfer unit configured to transfer the electric charges of the photoelectric converting unit,
an accumulating unit configured to accumulate the electric charges transferred by the transfer unit,
a reset unit configured to discharge the electric charges of the accumulating unit, and
a pixel output unit configured to convert the electric charges of the accumulating unit into a pixel signal and to output the pixel signal.

(Item 3)

The image capturing device according to Item 2, wherein
the first control line is connected to the transfer unit of the first pixel,
the second control line is connected to the transfer unit of the second pixel, and
the third control line is connected to the reset units of the first pixel and the second pixel.

(Item 4)

The image capturing device according to Item 2 or 3, wherein
the pixel output unit includes a selecting unit configured to select whether to output the pixel signal, and
the third control line is connected to the selecting units of the first pixel and the second pixel.

(Item 5)

The image capturing device according to any one of Items 2 to 4, including a plurality of pixel blocks each including one or more pixels of the plurality of pixels, wherein
the first control line is connected to a first pixel block of the plurality of pixel blocks, and
the second control line is connected to a second pixel block of the plurality of pixel blocks.

(Item 6)

The image capturing device according to Item 5, including:
a pixel chip having the plurality of pixels, and
a signal processing chip stacked with the pixel chip and configured to process pixel signals from the plurality of pixels, wherein
the signal processing chip includes a plurality of control blocks each provided corresponding to each of the plurality of pixel blocks and configured to control exposure for each of the one or more pixels.

(Item 7)

The image capturing device according to Item 6, wherein
the signal processing chip includes:
a main circuit unit having the plurality of control blocks, and
a peripheral circuit unit provided at the periphery of the main circuit unit at the signal processing chip, and
the peripheral circuit unit includes a global drive unit connected to the third control line.

(Item 8)

The image capturing device according to Item 7, wherein
the global drive unit is configured to supply a selection control signal for selecting the transfer unit to the plurality of control blocks via the third control line.

(Item 9)

The image capturing device according to any one of Items 6 to 8, wherein
the transfer unit includes:
a first transfer unit configured to transfer the electric charges of the photoelectric converting unit to the accumulating unit, and
a second transfer unit configured to transfer and discharge the electric charges of the photoelectric converting unit, and
the plurality of control blocks are configured to control an exposure time for each of the one or more pixels by changing a timing of at least one of the first transfer unit and the second transfer unit.

(Item 10)

An image capturing apparatus including the image capturing device according to any one of Items 1 to 9.

(Item 11)

An image capturing device including:
a first control block configured to control exposure of a first pixel included in a first pixel block,
a second control block configured to control exposure of a second pixel included in a second pixel block, and
a converting unit configured to convert a first signal output from the first pixel and a second signal output from the second pixel into digital signals, wherein
the first pixel block and the second pixel block are aligned in a column direction, and
the converting unit is configured to read the second signal after reading the first signal.

(Item 12)

The image capturing device according to Item 11, wherein
the first pixel block includes a plurality of the first pixels aligned in row and column directions, and
each of a plurality of the converting units is connected to the first pixels aligned in the column direction in the first pixel block.

(Item 13)

The image capturing device according to Item 12, wherein
the second pixel block includes a plurality of the second pixels aligned in the row and column directions, and
each of a plurality of the other converting units is connected to the second pixels aligned in the column direction in the second pixel block.

(Item 14)

The image capturing device according to Item 12, wherein
the second pixel block includes a plurality of the second pixels aligned in the row and column directions, and
each of the plurality of converting units is connected to the first pixels aligned in the column direction in the first pixel block and the second pixels aligned in the column direction in the second pixel block.

(Item 15)

The image capturing device according to any one of Items 11 to 14, wherein
a first substrate provided with the first pixel block and the second pixel block, and
a second substrate provided with the first control block, the second control block and the converting unit are stacked,
the first control block is arranged in a region corresponding to the first pixel block and the second control block is arranged in a region corresponding to the second pixel block, and the converting unit is arranged in a region corresponding to an outside of the regions corresponding to the first pixel block and the second pixel block.

(Item 16)

An image capturing apparatus including the image capturing device according to any one of Items 11 to 15.

EXPLANATION OF REFERENCES

10: exposure control unit, 20: pixel drive unit, 30: joining unit, 40: signal processing unit, 50: signal output unit, 100, 600: first substrate, 104: photoelectric converting unit, 110, 610: pixel unit, 112, 114: pixel, 115: pixel group, 120, 620: pixel block, 121: load current source, 122: signal line, 123: transfer unit, 124: outlet, 125: accumulating unit, 126: reset unit, 127: pixel output unit, 128: amplifying unit, 129: selecting unit, 132: connection region, 141: transfer control line, 142: discharge control line, 143: reset control line, 145: selection control line, 147: transfer selection control line, 150: connection region, 152: bump, 161: local control line, 162: local control line, 163: global control line, 200, 700: second substrate, 210, 710: control circuit unit, 220, 720: control block, 230: peripheral circuit unit, 232: connection region, 234: global drive unit, 250, 740: signal processing unit, 252, 253: ADC unit, 254, 255: connection region, 256: ADC, 400, 800: image capturing device, 500: image capturing apparatus, 501: system control unit, 502: drive unit, 503: photometry unit, 504: work memory, 505: recording unit, 506: display unit, 508: operation unit, 511: image processing unit, 512: calculating unit, 514: drive unit, 520: photographing lens, 730: joining unit, 750: signal output unit

What is claimed is:

1. An image capturing device comprising:
a first substrate having a plurality of pixel blocks, including
a first pixel block that includes a first photoelectric converter configured to convert light into electric charges, and
a second pixel block that includes a second photoelectric converter configured to convert light into electric charges the second photoelectric converter being arranged side by side with the first photoelectric converter in a row direction; and
a second substrate that is stacked with the first substrate and includes
a control circuit that includes
a first control block that controls an accumulation time of electric charges converted in the first photoelectric converter, and
a second control block that controls an accumulation time of electric charges converted in the second photoelectric converter, and
a converter configured to convert into digital signals a first signal based on the electric charges converted in the first photoelectric converter and a second signal based on the electric charges converted in the second photoelectric converter, wherein
the converter is arranged outside the control circuit in the second substrate.

2. An image capturing apparatus comprising the image capturing device according to claim 1.

3. The image capturing device according to claim 1, wherein
the control circuit is arranged at a position in the second substrate that faces the first pixel block.

4. The image capturing device according to claim 3, wherein
the first control block is arranged at a position in the second substrate that faces the first pixel block.

5. An image capturing apparatus comprising the image capturing device according to claim 4.

6. The image capturing device according to claim 4, wherein
the second control block is arranged at a position in the second substrate that faces the second pixel block.

7. The image capturing device according to claim 3, wherein
the control circuit is arranged at a position in the second substrate that faces the second pixel block.

8. The image capturing device according to claim 1, wherein
the converter includes
a first converting circuit configured to convert the first signal into a digital signal, and
a second converting circuit configured to convert the second signal into a digital signal.

9. The image capturing device according to claim 8, wherein
the control circuit is arranged between the first converting circuit and the second converting circuit in the second substrate.

10. The image capturing device according to claim 9, wherein
the first pixel block and the second pixel block are arranged along a first direction, and
the control circuit is arranged between the first converting circuit and the second converting circuit in a second direction that intersects with the first direction.

11. The image capturing device according to claim 8, wherein
the first converting circuit and the second converting circuit are arranged to sandwich the control circuit in the second substrate.

12. The image capturing device according to claim 1, wherein
the second substrate includes a peripheral circuit for reading the first signal and the second signal, and
the peripheral circuit is arranged outside the control circuit in the second substrate.

13. The image capturing device according to claim 12, wherein
the first control block outputs a first control signal for controlling the accumulation time of electric charges converted in the first photoelectric converter,
the second control block outputs a second control signal for controlling the accumulation time of electric charges converted in the second photoelectric converter, and
the peripheral circuit unit outputs a third control signal for reading the first signal and the second signal.

14. The image capturing device according to claim 13, wherein
the second control block outputs the second control signal at a timing that is different from a timing at which the first control block outputs the first control signal.

15. The image capturing device according to claim 12, comprising:
a first control line from which a first control signal for controlling the accumulation time of electric charges converted in the first photoelectric converter is output, the first control signal being a control signal output
from the first control block;
a second control line from which a second control signal
for controlling the accumulation time of electric
charges converted in the second photoelectric converter
is output, the second control signal being a control
signal output from the second control block; and
a third control line from which a third control signal for
reading the first signal and the second signal is output,
the third control signal being a control signal output
from the peripheral circuit.

16. An image capturing apparatus comprising the image capturing device according to claim 15.

17. The image capturing device according to claim 15, wherein:
the first pixel block includes
a first transfer unit configured to transfer the electric charges of the first photoelectric converter,
a first accumulating unit to which the electric charges of the first photoelectric converter are transferred, and
a first reset unit configured to discharge the electric charges of the first accumulating unit;
the second pixel block includes
a second transfer unit configured to transfer the electric charges of the second photoelectric converter,
a second accumulating unit to which the electric charges of the second photoelectric converter are transferred, and
a second reset unit configured to discharge the electric charges of the second accumulating unit;
the first control line is electrically connected to the first transfer unit;
the second control line is electrically connected to the second transfer unit; and
the third control line is electrically connected to the first reset unit and the second reset unit.

18. The image capturing device according to claim 17, comprising:
a first signal line from which the first signal is output;
a second signal line from which the second signal is output; and
a fourth control line from which a fourth control signal for reading the first signal and the second signal is output, the fourth control signal being a control signal output from the peripheral circuit, wherein
the first pixel block includes a first selecting unit for electrically connecting to the first signal line,
the second pixel block includes a second selecting unit for electrically connecting to the second signal line, and
the fourth control line is electrically connected to the first selecting unit and the second selecting unit.

19. The image capturing device according to claim 18, comprising:
a fifth control line from which a fifth control signal for controlling the accumulation time of electric charges converted in the first photoelectric converter is output, the fifth control signal being a control signal output from the first control block; and
a sixth control line from which a sixth control signal for controlling the accumulation time of electric charges converted in the second photoelectric converter is output, the sixth control signal being a control signal output from the second control block; wherein
the first pixel block includes a first discharging unit configured to discharge the electric charges of the first photoelectric converter,
the second pixel block includes a second discharging unit configured to discharge the electric charges of the second photoelectric converter,
the fifth control line is connected to the first discharging unit, and
the sixth control line is connected to the second discharging unit.

20. The image capturing device according to claim 17, comprising:
a fourth control line from which a fourth control signal for controlling the accumulation time of electric charges converted in the first photoelectric converter is output, the fourth control signal being a control signal output from the first control block; and
a fifth control line from which a fifth control signal for controlling the accumulation time of electric charges converted in the second photoelectric converter is output, the fifth control signal being a control signal output from the second control block, wherein
the first pixel block includes a first discharging unit configured to discharge the electric charges of the first photoelectric converter,
the second pixel block includes a second discharging unit configured to discharge the electric charges of the second photoelectric converter,
the fourth control line is connected to the first discharging unit, and
the fifth control line is connected to the second discharging unit.

21. The image capturing device according to claim 1, wherein
a plurality of the first photoelectric converters are arranged in the first pixel block, and
a plurality of the second photoelectric converters are arranged in the second pixel block.

22. The image capturing device according to claim 1, wherein
the second control block is arranged side by side with the first control block in the row direction.

23. The image capturing device according to claim 1, wherein
the first substrate includes a third pixel block that includes
a third photoelectric converter configured to convert light into electric charges, the third photoelectric converter being arranged side by side with the first photoelectric converter in a column direction, and
the control circuit includes a third control block that controls an accumulation time of electric charges converted in the third photoelectric converter.

24. The image capturing device according to claim 23, wherein
the converter is configured to convert into digital signals a third signal based on the electric charges converted in the third photoelectric converter.

25. The image capturing device according to claim 23, wherein
the third control block is arranged side by side with the first control block in the column direction.

26. The image capturing device according to claim 23, wherein
the control circuit is arranged at a position in the second substrate that faces the first pixel block, the second pixel block, and the third pixel block.

27. The image capturing device according to claim 1, wherein
the first substrate includes a third pixel block that includes a third photoelectric converter configured to convert light into electric charges, the third photoelectric converter being arranged side by side with the first photoelectric converter in the row direction, and the control circuit includes a third control block that controls an accumulation time of electric charges converted in the third photoelectric converter.

28. The image capturing device according to claim 27, wherein the converter is configured to convert into digital signals a third signal based on the electric charges converted in the third photoelectric converter.

29. The image capturing device according to claim 27, wherein the third control block is arranged side by side with the first control block in the row direction.

30. The image capturing device according to claim 27, wherein the control circuit is arranged at a position in the second substrate that faces the first pixel block, the second pixel block, and the third pixel block.

* * * * *